US012570465B1

(12) United States Patent　(10) Patent No.: US 12,570,465 B1
Bridges　(45) Date of Patent:　Mar. 10, 2026

(54) RETAIL PALLET RACK SUPPORT ASSEMBLY WITH REINFORCED BASE AND REPLACEABLE SHELF INTERFACE ADAPTER

(71) Applicant: Pallet Rack Avenger.Com, Inc., Tampa, FL (US)

(72) Inventor: Alan D. Bridges, Tampa, FL (US)

(73) Assignee: PALLET RACK AVENGER.COM, INC., Tampa, FL (US)

( * ) Notice: Subject to any disclaimer, the term of this patent is extended or adjusted under 35 U.S.C. 154(b) by 0 days.

(21) Appl. No.: 19/291,703

(22) Filed: Aug. 6, 2025

(51) Int. Cl.
　　*B65G 1/02*　(2006.01)
　　*B23P 6/00*　(2006.01)
(52) U.S. Cl.
　　CPC . *B65G 1/02* (2013.01); *B23P 6/00* (2013.01)
(58) Field of Classification Search
　　CPC ..... B65G 1/02; A47B 96/1441; A47B 47/027;
　　　　　　　　A47B 47/028; A47B 47/0058
　　USPC ................................................. 211/183, 187
　　See application file for complete search history.

(56) References Cited

U.S. PATENT DOCUMENTS

| | | | | | |
|---|---|---|---|---|---|
| 3,229,790 | A | * | 1/1966 | Shayne | F16B 12/50 211/187 |
| 4,088,229 | A | * | 5/1978 | Jacoby | A47B 91/00 211/183 |
| 4,239,122 | A | * | 12/1980 | Klein | A47B 96/145 52/834 |

| | | | | | |
|---|---|---|---|---|---|
| 5,369,925 | A | * | 12/1994 | Vargo | E04H 12/2292 211/183 |
| 6,152,314 | A | * | 11/2000 | Besanko | D06F 57/127 248/188.9 |
| 6,332,549 | B1 | * | 12/2001 | MacDonald | A47B 47/027 211/183 |
| 6,405,884 | B1 | * | 6/2002 | Dion | A47B 47/02 211/183 |
| 7,007,815 | B2 | * | 3/2006 | Anderson | A47B 47/027 211/183 |
| 7,828,161 | B2 | * | 11/2010 | Konstant | B65G 1/02 211/183 |
| 9,066,585 | B2 | * | 6/2015 | Kirby | A47B 57/44 |
| 10,974,352 | B1 | | 4/2021 | Klinger | |
| 11,690,446 | B2 | * | 7/2023 | Harrison | A47B 47/021 211/153 |

(Continued)

*Primary Examiner* — Jennifer E. Novosad
(74) *Attorney, Agent, or Firm* — Anton J. Hopen; Trenam Law

(57)　　　　　　　　ABSTRACT

An apparatus reinforces the lower portion of a pallet-rack upright while furnishing a replaceable interface for a floor-level shelf beam. A rigid steel base frame includes a vertically oriented main tube welded to at least one horizontal brace, the members using plate thicknesses of at least one-eighth inch to support rack loads and resist forklift impact. A tubular front adapter post is fixed to and spaced ahead of the main tube; opposed lateral walls of the post present vertically separated apertures. A rack-interface adapter telescopes over the post and is removably secured by fasteners extending through aligned openings in the adapter and post. The adapter carries a vertical series of shelf-engagement slots and defines an internal cavity that clears shelf-bracket lugs. Abutting flanges transfer vertical and impact forces from an engaged beam into the main tube. The adapter can be exchanged without disturbing the anchored base frame or overlying rack.

6 Claims, 15 Drawing Sheets

(56)                References Cited

U.S. PATENT DOCUMENTS

| | | | |
|---|---|---|---|
| 11,691,229 B2 * | 7/2023 | Klinger | B23P 19/041 |
| | | | 211/183 |
| 11,958,686 B2 * | 4/2024 | Turcich | B65G 1/02 |
| 2004/0094496 A1 * | 5/2004 | MacDonald | B65G 1/02 |
| | | | 211/183 |
| 2007/0170137 A1 * | 7/2007 | Thelwell | E01F 15/0469 |
| | | | 211/183 |
| 2008/0029676 A1 * | 2/2008 | Huxtable | F16F 7/00 |
| | | | 248/345.1 |
| 2008/0083686 A1 * | 4/2008 | Jones | B65G 1/02 |
| | | | 211/191 |
| 2012/0298600 A1 * | 11/2012 | McCarthy | B65G 1/02 |
| | | | 211/49.1 |
| 2019/0150616 A1 * | 5/2019 | Beadle | A47B 57/402 |
| 2025/0019161 A1 * | 1/2025 | Ackeret | B65G 1/02 |

* cited by examiner

RETAIL PALLET RACK SUPPORT ASSEMBLY WITH REINFORCED BASE AND REPLACEABLE SHELF INTERFACE ADAPTER

BACKGROUND OF THE INVENTION

The present invention relates to storage rack assemblies used for holding palletized and shelved goods. More particularly, it concerns a pallet rack support assembly for retail environments, incorporating a reinforced lower upright frame and a modular, replaceable shelf interface adapter in the floor-adjacent zone. The assembly is designed to withstand heavy impact (e.g., from forklifts) while enabling low-positioned shelves for consumer access.

Pallet rack systems are widely used in warehouses and large retail stores (e.g., warehouse clubs and home improvement stores) to store goods on pallets and shelves. In such retail warehouse environments, pallet racks serve a dual purpose: warehousing inventory and displaying products for direct consumer access. A typical pallet rack consists of upright posts (vertical frames) with perforated or slotted columns onto which horizontal beams or shelves are hooked at various heights. These slots often follow industry-standard geometries, such as "teardrop"-shaped keyhole openings or "keystone" trapezoidal openings, which allow beams with corresponding lugs to interlock without separate fasteners.

Different rack manufacturers use different slot designs, and these are not always cross-compatible, complicating reconfiguration or mixed use of shelving components. One persistent problem with pallet racks is damage due to forklift impacts. Forklifts and pallet jacks operate in close proximity to rack uprights, and collisions (especially near the base of the uprights) are relatively common. Even a minor collision can bend or weaken an upright post, creating a serious safety hazard given the heavy loads borne by the racks. Conventionally, any significantly damaged rack post must be unloaded and replaced to restore structural integrity. Replacing an upright is time-consuming and costly, often requiring disassembly of the rack and downtime. To mitigate these issues, the industry has developed various reinforcement and repair solutions for the lower portions of rack frames.

U.S. Pat. No. 6,405,884 (Dion, 2002) discloses a pallet rack reinforcement unit that strengthens the bottom of an existing pallet rack frame. This unit uses heavy-gauge tubular posts with floor anchor plates and C-shaped connecting members to encapsulate the lower upright, reinforcing it against impact without replacing the entire rack. The reinforcement kit is made of substantially thicker steel than the original rack and includes deflector components to divert frontal collision forces. While effective for protecting industrial racks from forklift damage, the Dion '884 patent focuses on structural reinforcement and does not provide features for low-mounted retail shelving or modular adaptability to different shelf types.

U.S. Pat. No. 6,332,549 (McDonald, 2001) describes a repair kit for an industrial pallet rack frame with a damaged lower post. The kit is a pre-welded assembly that replaces the lower section of a front upright (leg) after the damaged portion is cut away. It typically comprises a new upright segment and bracing that attach to the remaining portion of the rack, often transferring loads to the rear leg for support. Notably, this solution requires very precise on-site cutting of the old post and is manufactured with all joints pre-welded. Installation can involve bolting or welding the new segment in place of the removed section. The McDonald '549 kit is primarily aimed at restoring structural capacity after damage and, like the Dion patent, does not address adding a low shelf interface. It lacks a quick-change modular component; once installed, the reinforcement is permanent and not intended for easy replacement or adaptation to different connector styles.

U.S. Pat. No. 10,974,352 (Klinger et al., 2021) teaches a modern modular pallet rack repair kit and method for on-site repair of rack uprights without welding. This patent (and related family patents) introduces a replaceable post section that can be cut to size on-site and bolted into place, avoiding the need for pre-welded, one-size parts. For example, the Klinger '352 patent describes a footplate and post receiving member assembly that anchors a new lower post segment to the floor and mechanically joins it with the remaining upright. The kit improves efficiency by enabling repairs in the field while loaded racks remain largely in service. However, like the older solutions, Klinger '352 is directed at structural post repair. It does not contemplate an interchangeable shelf interface adapter for different shelf configurations, nor does it specifically cater to the needs of retail shelving at floor level.

None of the above prior art solutions adequately addresses the challenges unique to retail pallet rack usage. In retail settings, it is often desirable to have a low-mounted shelf (near the floor) for storing merchandise in a customer-accessible way (for example, the bottom shelf in a big-box retail rack). Standard industrial pallet racks typically do not include shelf beams at floor level, and reinforcement kits tend to obstruct or omit the lowest slot positions. Moreover, the prior designs focus on permanently reinforcing or splicing rack posts for strength, not on providing sacrificial, easily replaceable components. If a bracket or connector at the bottom of a retail rack is struck by equipment or damaged by shopping carts, the ideal solution would allow that piece alone to be swapped out without compromising the whole frame. Accordingly, there is a need for a pallet rack support assembly suited to retail environments that (1) allows floor-adjacent shelving: providing secure attachment for a shelf or beam at or near ground level for product display; (2) maintains structural integrity under impact: incorporating a hardened, reinforced base frame that can absorb forklift collisions like a fixed guard; (3) features a modular, replaceable interface: using a detachable adapter piece that carries the shelf connection geometry (e.g., teardrop or keystone slots) and can be readily replaced if deformed or to accommodate different shelf systems; and (4) preserves load-bearing structure: ensuring the adapter itself is non-load-bearing or minimally load-bearing, so that the main upright frame continues to carry the weight of stored goods, thereby allowing the adapter to fail or deform safely under severe impact (acting as a sacrificial component).

The present invention fulfills these needs by providing a pallet rack support assembly with a reinforced lower frame and a replaceable shelf interface adapter that offers compatibility with multiple standard shelf connector styles and quick field-replacement upon damage or reconfiguration.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The invention is a retail pallet rack support assembly designed to combine heavy-duty impact resistance with flexible shelf mounting options near the floor. Broadly, the assembly consists of a reinforced vertical base frame (forming the lower section of a rack upright) and a replaceable rack interface adapter attached to this base frame in the floor-adjacent zone.

The base frame is a fixed structural element, preferably made of high-strength steel and anchored to the floor, capable of withstanding collisions from warehouse equipment (such as forklift tines). In contrast, the interface adapter is a modular, non-structural component that provides the means to mount a shelf or beam at low elevation. The adapter can be customized or selected for different lug-and-slot geometries (for example, a teardrop slot pattern or a keystone slot pattern) to mate with various standard shelf beam designs. The adapter is designed to be sacrificial and quickly replaceable: it will absorb or break away under impact stress to protect the base frame, and it can be removed and replaced (or swapped for a different type) without requiring disassembly of the entire rack.

Reinforced Base Frame for Impact Resistance. The lower portion of the upright (the base frame) is constructed with reinforcement (e.g., thicker gauge steel, internal gussets, or a tubular sleeve). It acts as a built-in post protector capable of withstanding fork impacts at the base without significant deformation. This base frame includes a floor anchor (such as an integrated footplate with anchor bolts) securing the assembly to the concrete floor for stability.

Low-Level Shelf Attachment. The design enables a shelf or cross-beam to be attached at a floor-adjacent height (e.g., within a few inches off the ground), which is ideal for retail product access. The adapter provides one or more connector interfaces (slots, holes, or lugs) at this low height, allowing standard shelf beams to engage just as they would in higher positions on a traditional upright. This permits the bottom shelf to be positioned much lower than in typical warehouse racks, effectively utilizing the floor level for storage/display.

Replaceable Interface Adapter. The shelf interface adapter is a discrete module mechanically fastened to the base frame (for example, via bolts, pins, or a dovetail slide fit with locking pins). It can be removed and replaced in the field. In normal use, the adapter securely holds the shelf beam; but if the shelf or adapter is hit by a forklift or otherwise damaged, the adapter can detach or deform to absorb the impact, leaving the base frame intact. A damaged adapter can then be swapped out for a new one quickly, restoring the rack to full functionality without costly repairs to the upright itself.

Multi-Geometry Compatibility. Different retail chains or rack systems may use different beam coupling designs (e.g., some use the teardrop slot with round-ended keyholes, while others use keystone or other proprietary shapes). The invention's adapter can be manufactured in different versions to match these standards. For example, one adapter plate might have a standard teardrop aperture pattern to accept teardrop-style beam lugs, while another adapter plate could have keystone-shaped openings for a beam of that type. The base frame includes a common mounting interface so that any compatible adapter variant can be attached. This modular compatibility means a retailer can reconfigure or reuse the same reinforced base with different shelving systems by simply changing out the adapter component, rather than replacing the whole upright. In some embodiments, a single adapter might even feature multiple slot types on the same piece (for instance, a hybrid slot arrangement) to universally accommodate various beams—though in most cases separate swappable adapters would be used for clarity and strength.

Non-Load-Bearing, Sacrificial Design. The interface adapter is substantially non-load-bearing with respect to the vertical load of the rack. The weight of pallets or shelves is primarily transmitted through the base frame into the floor. The adapter's role is mainly to hold the shelf beam in position (engaging it to prevent movement). Because it is relieved of major structural load, the adapter can be made intentionally weaker or frangible in certain aspects (for example, using a thinner gauge steel or designed bending points) so that a strong impact will cause the adapter to bend or shear off before the base frame or upright is compromised. In this way, the adapter acts as a sacrificial fuse: it protects the more critical structural elements by failing first. After such an event, the adapter can be quickly unbolted and a new one attached, with minimal downtime and without needing to unload the rack or replace the upright. This contrasts with prior art systems where an impact often necessitates cutting out and replacing the entire lower post.

Ease of Installation and Service. The assembly can be installed as part of a new rack installation or retrofitted onto existing racks (for example, by cutting off a damaged lower section of an upright and attaching the new base frame in its place, similar to a repair kit but with the added adapter feature). No welding is required on site—all components can be pre-fabricated, and the adapter is attached with mechanical fasteners. The replaceable adapter also simplifies long-term maintenance: different adapters can be stocked for various beam types, and replacing one requires only basic tools to remove bolts or pins. This modular approach reduces repair time from potentially hours (for cutting and welding a new post) to just minutes to swap an adapter.

Structural Configuration. In one exemplary embodiment, the reinforced base frame is a steel tubular column segment about 12-18 inches tall, welded to a thick steel footplate that anchors to the floor via concrete anchor bolts. The upper end of this base segment securely connects to the standard upper upright (which continues vertically to form the rest of the rack frame). The connection may be a welded splice or a bolted flange joint designed to be as strong as a continuous post. The base frame's wall thickness and cross-section are selected to withstand frontal and lateral impacts; for example, it might be a 3"×3" square steel tube with a ¼"

wall, which is significantly more robust than typical roll-formed rack columns. The front face of the base frame (facing the aisle) may be smooth or may include a mounting bracket for the adapter.

The replaceable adapter in this embodiment is a generally flat plate or bracket that attaches to the front face of the base frame near the floor. Suppose the base frame has pre-drilled holes or welded nuts; the adapter plate can be bolted onto the base. The adapter plate has a series of apertures (slots) matching the profile of standard shelf beam connector lugs. For instance, it may have a pair of vertically spaced teardrop-shaped holes to receive the two prongs of a beam's connector bracket (mimicking the pattern that would normally be punched in an upright column). The spacing of these holes can correspond to the industry standard (often 2" or 3" apart vertically). In another version, the adapter plate could have trapezoidal keystone slots or other shapes, depending on the shelving system. The vertical position of the adapter's slots is calibrated such that when a beam is hooked into the adapter, the beam sits at the desired height above the ground (e.g., ~4 inches off the floor, just enough to clear the footplate and floor). The adapter does not carry the weight alone; typically the shelf beam might also bear on a small ledge or the floor or simply transfer load into the adapter which in turn presses on the robust base frame. Mechanical fasteners (e.g., two or more grade-5 or grade-8 bolts) secure the adapter. The fastening method may include shear-off bolts or designed weak points so that a severe impact will cause the bolts to shear or the adapter material to yield around them, releasing the adapter before the force can twist or buckle the base frame. Optionally, a safety pin or retaining clip can be included to ensure the adapter (and shelf beam) remain in place during normal operation, but can be intentionally removed for service.

Under normal use, the pallet rack support assembly functions like any standard rack upright at the base. The bottom shelf is attached to the adapter at floor level, allowing employees or customers to place items on that shelf easily. The reinforced base frame provides confidence that even if a pallet is being loaded onto higher shelves by a forklift, accidental low strikes (for example, a forklift's fork skimming along the floor) will hit a hardened section of the upright. If such an impact occurs at the very bottom where the shelf interface is, the adapter will take the brunt of the hit. For example, the fork might collide with the bottom shelf beam and push against the adapter; the adapter plate might bend or its bolts might snap. The energy is absorbed by that damage, preventing or minimizing deformation of the base frame itself. The shelf beam may then drop to the floor if the adapter gives way (which is preferable to the upright collapsing). After the incident, the damaged adapter can be unbolted and removed. The base frame can be inspected—since it's heavily reinforced, it is likely undamaged or only superficially scraped. A new adapter (of the same type) is then attached in place, and the shelf beam is re-mounted, restoring the rack. This modular repair can be done in a short time, and because the main upright was not compromised, the rack does not need extensive unloading or reconstruction. In contrast, without such a sacrificial adapter, the impact could have bent the upright, requiring a full replacement or a complex repair kit installation.

By combining an impact-resistant base with a low shelf adapter, the invention is particularly suited for big-box retail stores or warehouse-style retail where customers shop directly from pallet racks. The bottom shelf (often containing heavy or bulky items) can be positioned near the ground for convenience. The reinforced base gives peace of mind that shopping carts, pallet jacks, or low forklift forks won't easily damage the rack's structural post. And in the event of damage to the shelf bracket, store maintenance staff can quickly fix it by swapping the adapter, possibly even during a brief off-peak period, without specialized labor or contractors. This reduces safety risks and maintenance costs.

The invention provides a reinforced lower-upright assembly for pallet-rack frames that simultaneously strengthens the impact-prone base region and supplies a detachable, floor-level shelf interface. A rigid base frame is fabricated from steel plate or tubing no thinner than about one-eighth inch and includes a vertically oriented main tube welded to at least one horizontal brace sized to carry the vertical loads of an overlying rack and to withstand fork-truck impacts. Spaced forward of, and parallel to, the main tube is a tubular front adapter support post rigidly secured to the base frame; the post bears at least two, and preferably three, vertically separated apertures on laterally opposed walls. A rack-interface adapter, shaped as a hollow sleeve, telescopes over the post. Its front wall carries a vertical array of shelf-engagement slots, preferably key-hole "teardrop" openings, while a pair of rearward side flanges flank the post and bear against the forward face of the main tube, thereby transferring pallet and impact loads into the heavy structural member. Fastener openings in the flanges register with the post apertures so that opposed bolts, captive-nut assemblies, or a single vertical through-pin with a removable retention ring can secure the adapter; the arrangement allows the adapter to be detached and replaced, or exchanged for another adapter having a different slot geometry, without disturbing the anchored base frame. An interior cavity bounded by the front wall and flanges provides at least a ten-millimetre clearance zone for shelf-bracket lugs, and the adapter wall may be less than half the thickness of the main tube so it will preferentially deform under impact and act as a sacrificial component. Optional upper and lower telescoping braces carried in sleeves on the main tube adjust in length until they lock to a rear upright of the rack, restoring bay depth and further stiffening the retrofit.

In a second, stand-alone embodiment, a reinforced lower-upright frame employs a primary vertical tube and at least one horizontal brace. A tubular front adapter post is fixed forward of the primary or main tube and presents opposed apertures. A surrounding rack-interface adapter slides over the post; its front wall offers a vertical series of shelf-engagement slots, its rearward flanges confront the primary tube, and its side flanges carry fastener openings that align with the post apertures. Stop lips on those flanges butt the primary tube to ensure vertical load transfer, while an internal cavity clears bracket lugs. The adapter, whose wall thickness is intentionally less than half that of the primary tube, is removable by withdrawing the fasteners, allowing rapid field replacement after impact.

A complementary repair method removes a damaged lower segment of a rack upright, positions the reinforced lower-upright frame with its front adapter post in the resulting gap, anchors the frame to both the floor and the remaining upper upright, then slides the rack-interface adapter over the post so its shelf-slots reside at the desired floor-level shelf height. Removable fasteners (bolts or a retention-ring-secured through-pin) are installed through the aligned openings to retain the adapter, after which a shelf beam may be re-hung immediately. The rack can remain loaded above the repair during this procedure.

If future requirements change, one adapter can be withdrawn and a second adapter with a different slot pattern installed, all without disturbing the reinforced frame or unloading the rack.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1A:
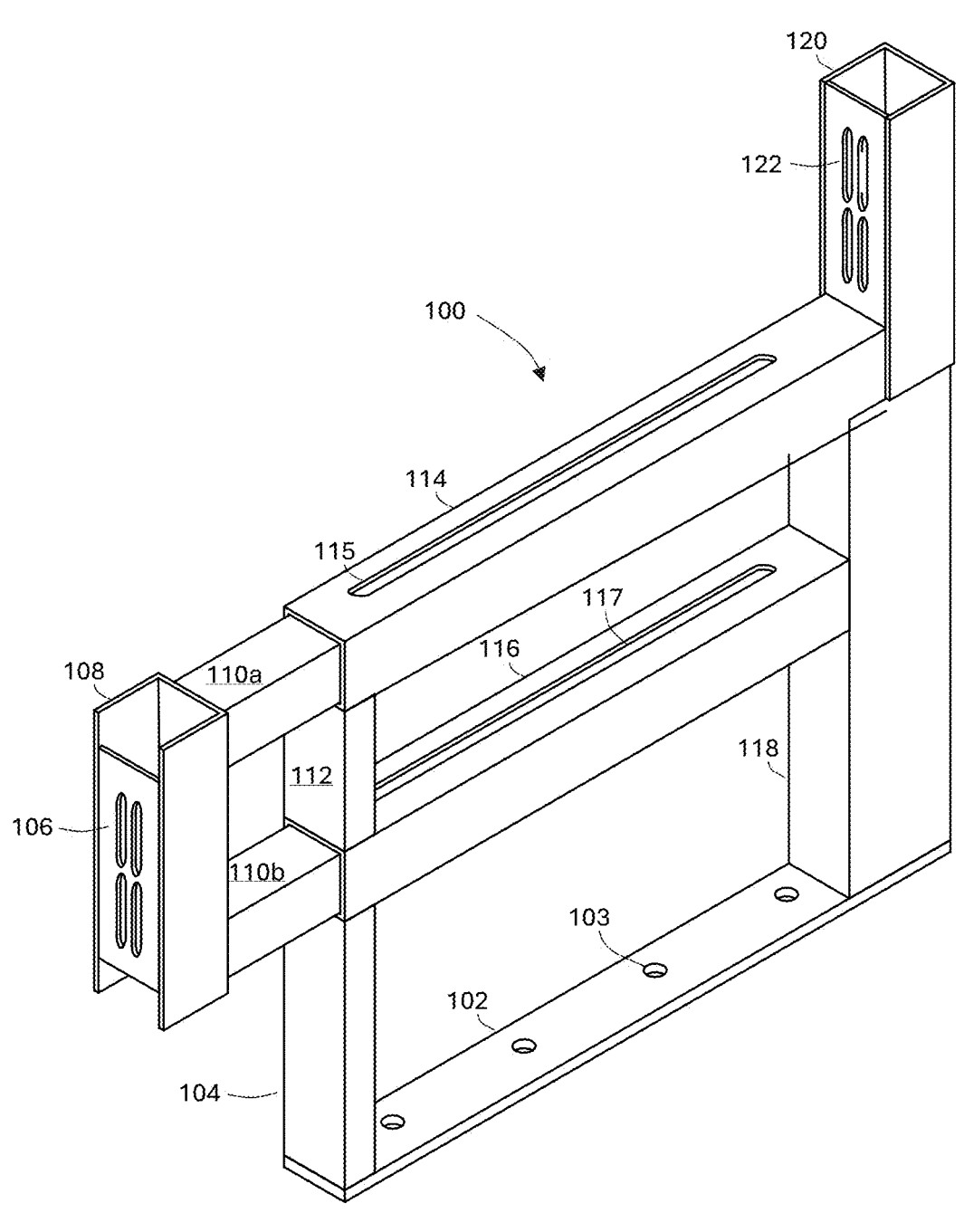
FIG. 1A is a perspective view of an existing industrial pallet rack support assembly showing a reinforced lower upright base frame.
Figure 1B:
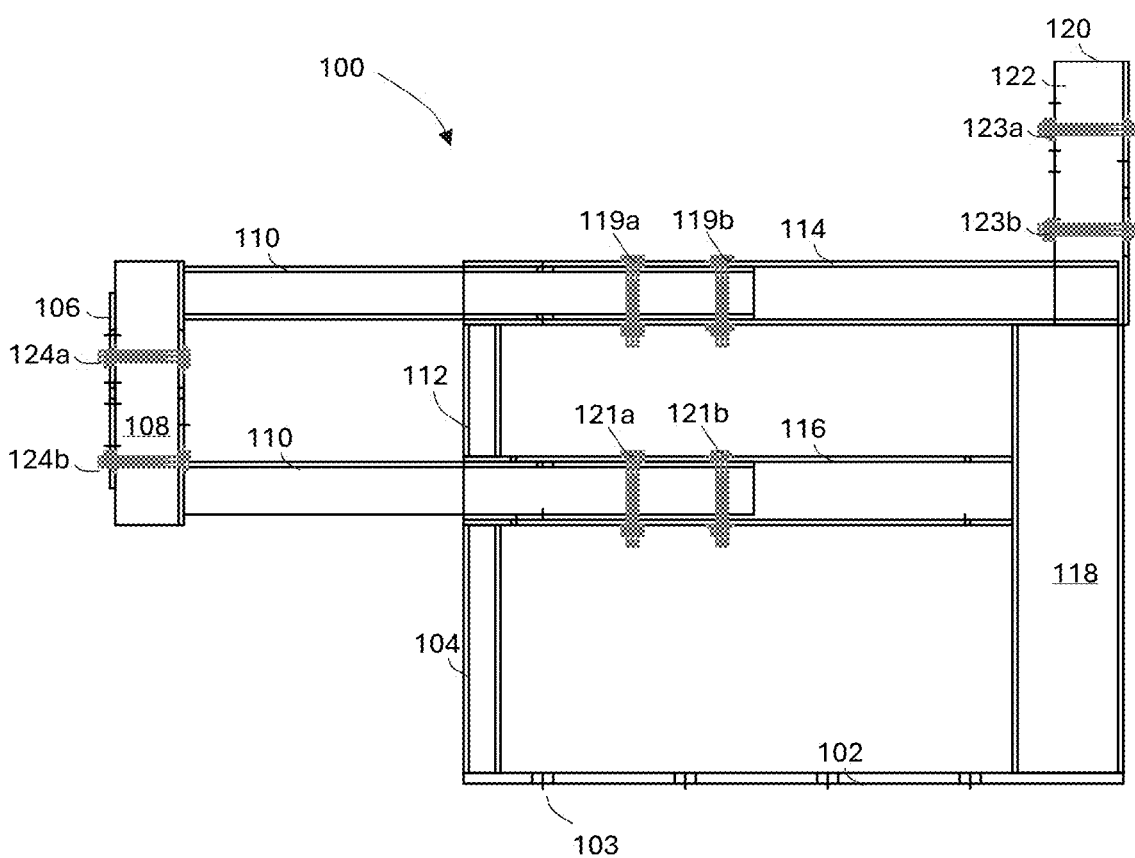
FIG. 1B is an exploded, side view of an existing industrial pallet rack support assembly showing a reinforced lower upright base frame.

Referring to FIGS. 1A and 1B, a reinforced support assembly 100 is illustrated that replaces a damaged lower section of a pallet-rack upright while restoring both structural capacity and beam-connector geometry. Assembly 100 is fabricated as a rigid welded sub-frame that is anchored directly to the concrete slab by an integral anchor plate 102. Anchor plate 102 includes a series of floor-anchor apertures 103 sized for heavy-duty concrete anchors, thereby transmitting vertical rack load and impact forces into the floor.

A main vertical tube 118 is welded along the forward edge of anchor plate 102. Tube 118 presents the greatest cross-sectional perimeter of any member in the sub-frame because it occupies the aisle-facing position most susceptible to forklift impact. Rearward of tube 118, an outside vertical tube 104 is fixed to anchor plate 102 and aligned with the inboard face of the rack frame. Tube 104 is dimensioned to nest against, or within, the remaining stump of the original front upright when the assembly is installed.

Upper and lower slider tubes 110a and 110b project rearward from tube 118. Each telescopes into a corresponding female slider, upper female slider 114 and lower female slider 116, that is welded to outside tube 104. Longitudinal overlap is set by inserting bolts through an upper adjusting slot 115 in slider 114 and a lower adjusting slot 117 in slider 116; the bolts clamp slider and tube together, preventing relative movement. Once secured, the slider assembly fixes the spacing between tubes 118 and 104 and establishes a rigid planar truss.

To splice the sub-frame into the rack, the undamaged upper portion of the original front upright is received in a front cuff 120 welded to the top of tube 118. A front half plate 122 carried on cuff 120 reproduces the original connector-hole geometry so that existing shelf beams can re-engage without modification. Opposed front vertical-support retaining bolts 123a and 123b pass through aligned bores in cuff 120, plate 122, and the rack upright, locking the splice in compression and shear.

Outside tube 104 terminates in a rear backer plate 106. A rear cuff 108 overlaps plate 106 to clamp the remaining portion of the rack's original column when rear vertical-support retaining bolts 124a and 124b are tightened. This clamp transmits vertical and horizontal forces into assembly 100 without field welding. Upper telescoping adjusting bolts 119a and 119b and lower telescoping adjusting bolts 121a and 121b complete the lock between slider tubes and female sliders, resulting in a closed load path from tube 118 through the slider brace set to tube 104 and into the rack frame.

In service, frontal impact loads delivered to main tube 118 are carried directly to anchor plate 102 and simultaneously distributed rearward through slider tubes 110a, 110b into outside tube 104. The clamped connection at rear cuff 108 transfers residual forces into the standing rack column, thereby maintaining rack alignment. Because main tube 118 is oversized, deformation is confined to the assembly rather than the rack frame. If tube 118 is compromised by a subsequent collision, the entire sub-frame 100 can be removed by unbolting the clamped and telescoping joints and replaced with a new unit without disturbing the upper rack structure.

Figure 2A:
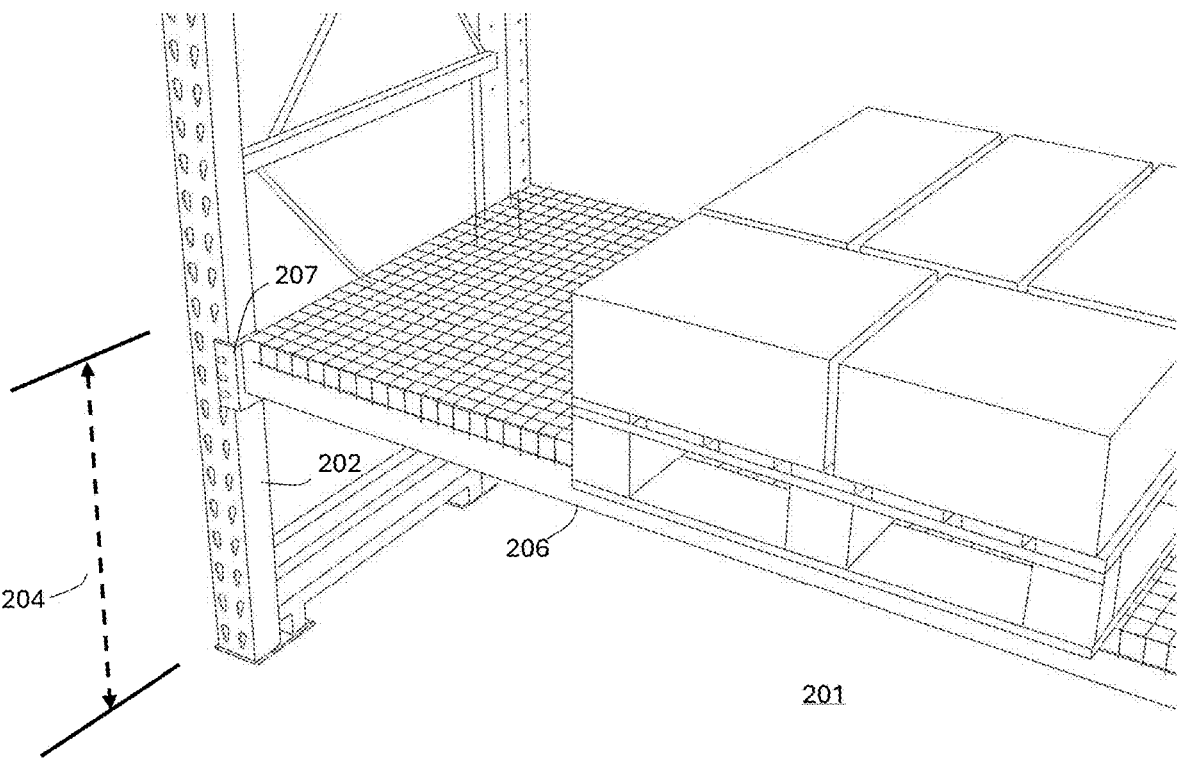
FIG. 2A is a perspective view of a retail pallet rack assembly commonly seen in home improvement stores without a reinforced lower base frame.

Referring to FIG. 2A, a portion of a pallet-rack bay is illustrated in perspective to explain the positional context in which the present invention will operate. A warehouse floor 201 supports a palletized load resting on a wire-decked shelf beam assembly designated generally as lower retail shelf 206. In retail environments, the load is removed from the pallet and offered to the consumer for shopping and checkout. Shelf 206 is engaged to a perforated rack upright or vertical post 202 by a conventional two-lug shelf bracket 207. In a retail configuration the bracket 207 is commonly positioned in a zone that lies only a short distance above floor level. This region, identified by vertical span 204, is referred to herein as the floor-adjacent shelf-level zone and typically spans from the slab surface upward to about one meter (approximately three to four feet). Because forklifts and pallet jacks operate at this same elevation, vertical post 202 is highly vulnerable to impact within zone 204. The view therefore illustrates the practical need for a reinforced support assembly that can absorb collisions in zone 204 while still providing shelf-mounting apertures compatible with bracket 207 for supporting shelf 206 at a consumer-accessible height.

Figure 2B:
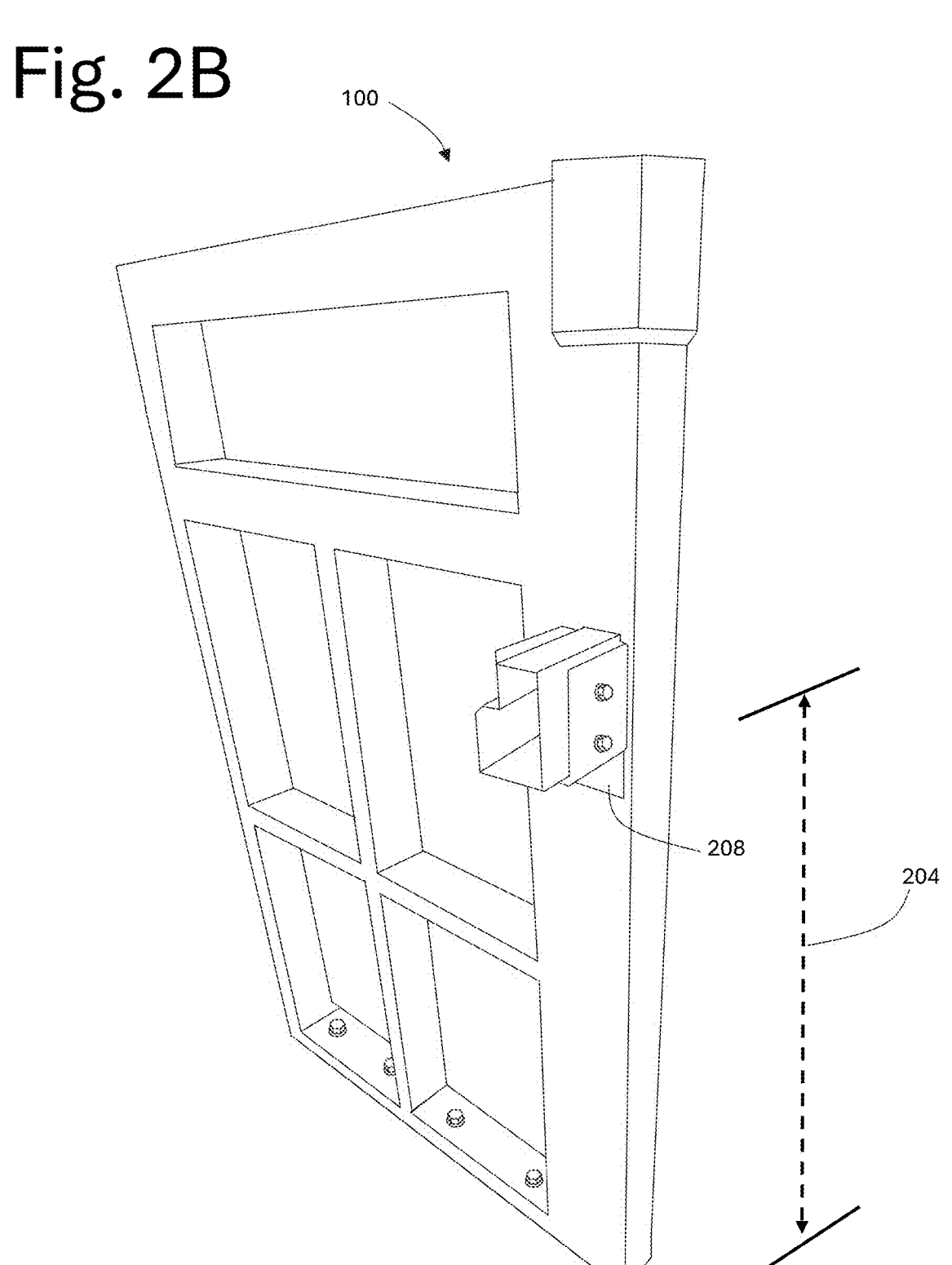
FIG. 2B is a perspective view of a reinforced lower upright base frame adapted to accommodate a lower-set retail shelf member.

Referring to FIG. 2B, the prior-art reinforced support assembly 100 is shown after installation, with a retrofit shelf adapter 208 affixed directly to the aisle-facing surface of the frame within the floor-adjacent shelf-level zone 204. Adapter 208 is a block-style bracket fastened to the reinforced structure by field-drilled bolts. Because the structural members of assembly 100 are fabricated from hardened, thick-gauge steel, drilling and tapping precise holes on site is labor-intensive and may introduce stress concentrations or coating damage that compromise corrosion resistance. The adapter further establishes a single, non-adjustable shelf-mounting elevation; to reposition the lower shelf, an installer must redrill new holes or relocate the entire bracket. If adapter 208 is struck by equipment or deformed under load, removal requires unbolting and extracting fasteners that are recessed in the impact zone, then redrilling or re-tapping replacement holes, operations that are time-consuming and risk collateral damage to the reinforced frame. Accordingly, bracket 208 provides a rudimentary shelf interface, its fixed placement, interface rigidity, and invasive attachment method highlight the need for a modular, easily replaceable shelf connector that can be secured without machining the hardened base and that accommodates multiple elevation settings within zone 204.

Figure 3A:
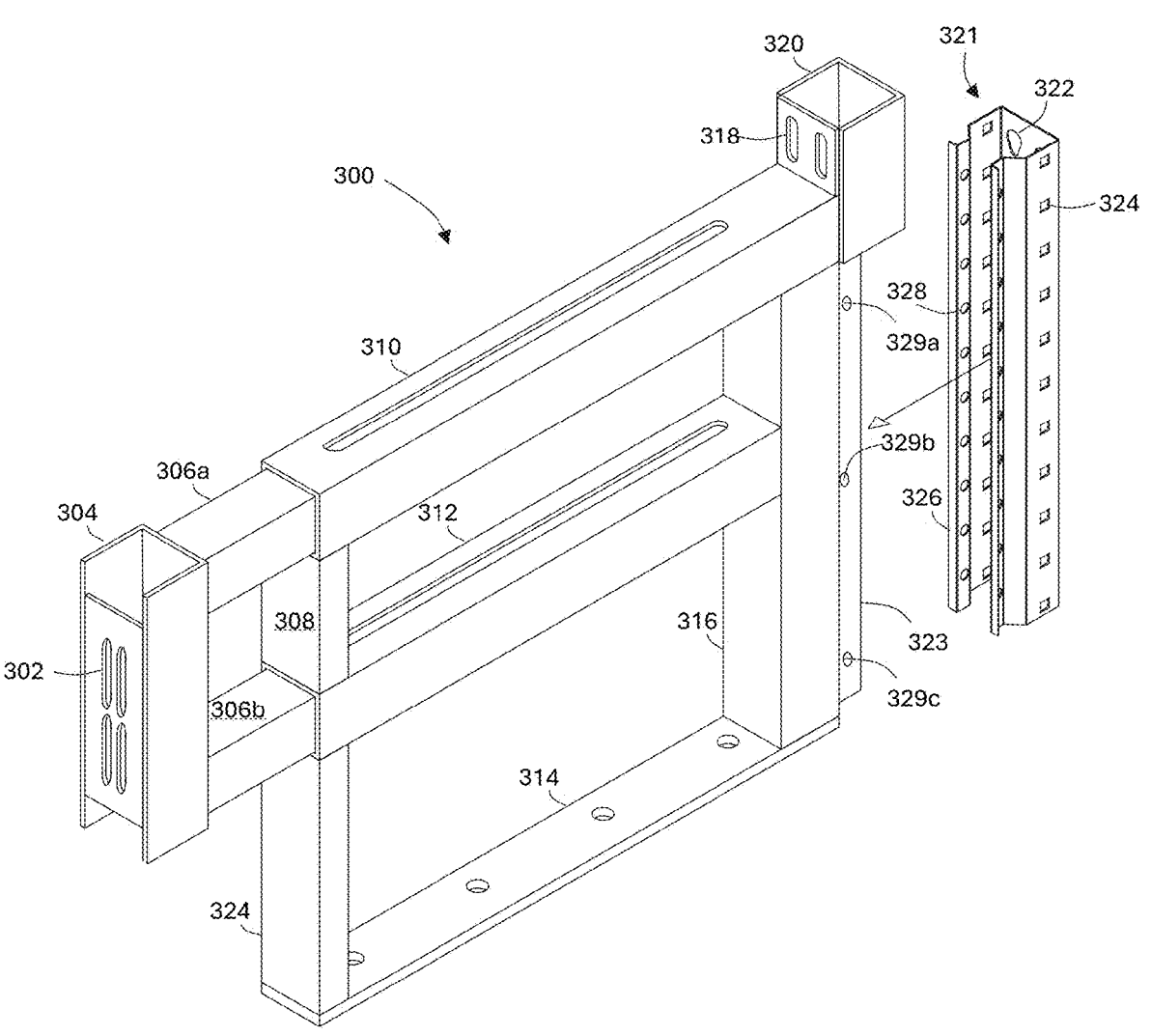
FIG. 3A is an exploded perspective view of the pallet rack support assembly, depicting the separate components: the reinforced base frame (with its floor footplate and anchors), the interface adapter removed from the base frame.

Referring to FIG. 3A, a pallet-rack support assembly 300 is illustrated in exploded perspective to show the relationship between a reinforced base frame and a removable rack-interface adapter 321. The base frame is constructed around a front adapter support post 323 welded to a floor anchor plate 314. Anchor plate 314 incorporates a series of floor-anchor apertures and, in the embodiment of FIG. 3D, two laterally projecting feet 315 for additional moment resistance. A pair of horizontal brace beams, upper brace 310 and lower brace 312, extend rearward from post 323 and are joined to a rear capture structure that includes a rear vertical-post backer plate 302, a rear support cuff 304, and slider tubes 306a, 306b telescoped into an outside top vertical tube 308. This brace set ties the reinforced base to the standing rear upright of the rack while preserving original bay spacing.

Front-side column continuity is provided by a front half cuff 320 and a front half plate 318 configured to receive the trimmed end of the untouched upper rack upright. Within the aisle-side impact path, the main vertical tube 316 is dimensioned to exceed the wall thickness of standard rack columns; tube 316 cooperates with post 323 to create a rigid boxed corner able to absorb forklift collisions without yielding.

Rack-interface adapter 321 is a separate tubular member whose internal cavity is sized to slide over post 323 along an adapter support post receiving slot (see 408 in later figures). The adapter carries opposed support-post flanges 326 that straddle post 323 and align a series of support post adapter mounting apertures 328 with receiving apertures 329a, 329b, and 329c in the post. When the adapter is fully seated, bolts or pins passed through apertures 328 and 329 lock the adapter against vertical or torsional displacement. The forward wall of adapter 321 provides a column of front interface shelf receiving slots 322 that replicate the lug pattern of the original rack, while each lateral wall includes a column of square side interface shelf receiving apertures 324 for optional through-bolting of shelf hardware.

Figure 3B:
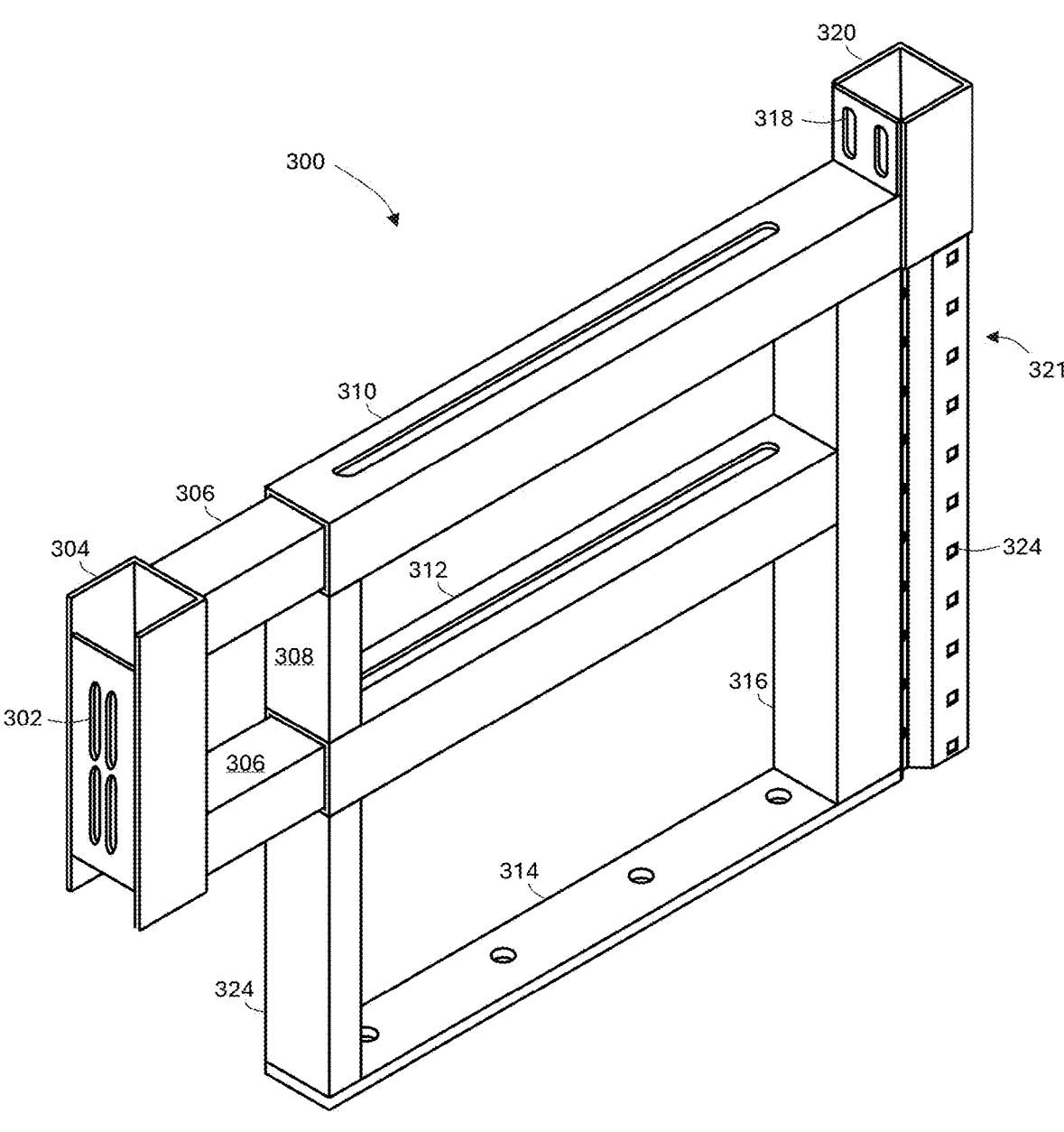
FIG. 3B is perspective view of the pallet rack support assembly, depicting the engaged components: the reinforced base frame (with its floor footplate and anchors), the interface adapter coupled to the base frame.

FIG. 3B shows assembly 300 with adapter 321 fully engaged. The adapter's flanges 326 abut the outer faces of main vertical tube 316, and mounting fasteners seated through apertures 328 and 329 rigidly clamp the parts together, producing a composite column whose outer face now presents the replicated slot array 322. Because adapter 321 is non-load-bearing in the vertical sense, axial pallet weight is carried by post 323 and tube 316, the adapter may be fabricated from thinner material and treated as sacrificial; when deformed, it can be unbolted and replaced without disturbing the base frame.

Figure 3C:
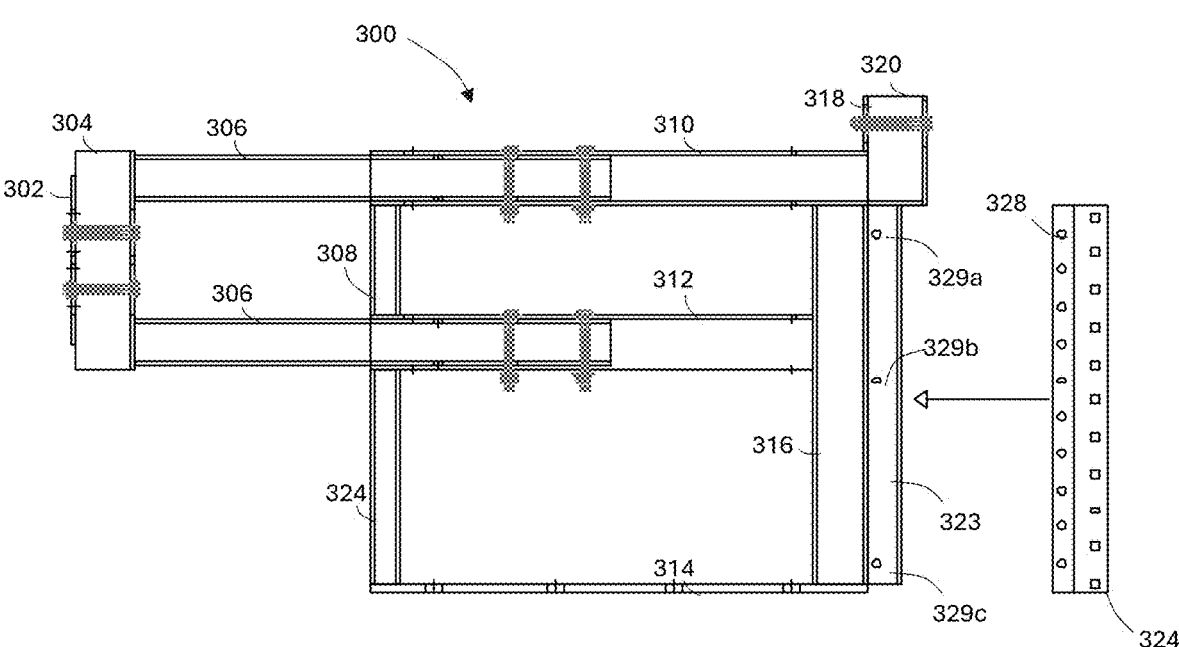
FIG. 3C is an exploded side elevational view of the pallet rack support assembly, depicting the separate components: the reinforced base frame (with its floor footplate and anchors), the interface adapter removed from the base frame.

FIG. 3C provides a side-elevational exploded view of the same components, illustrating the vertical spacing of receiving apertures 329a, 329b, and 329c along post 323. In typical installation two bolts are sufficient for static shelf loading, while a third fastener through aperture 329c may be added where higher impact duty is anticipated.

Figure 3D:
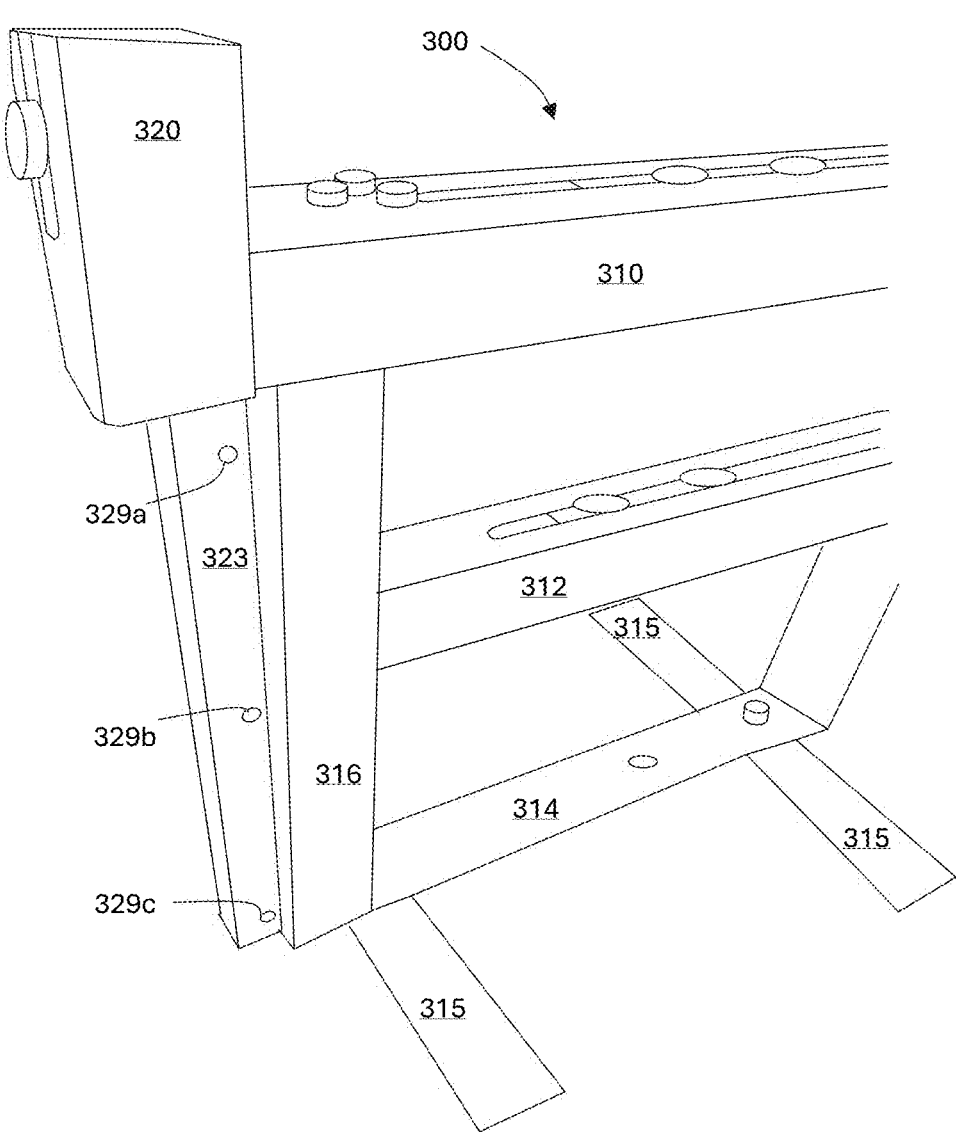
FIG. 3D is a perspective view of the pallet rack support assembly, depicting the reinforced base frame (with its floor footplate and anchors) without the interface adapter.

FIG. 3D depicts the reinforced base frame with adapter 321 removed, revealing the flush outer surface of post 323 and the convenient access to receiving apertures 329a-329c. With the adapter absent, the installer may inspect or service the base frame, replace damaged fasteners, or fit an adapter having a different slot geometry without altering any welded structural element of the rack.

Figures 4A, 4B:
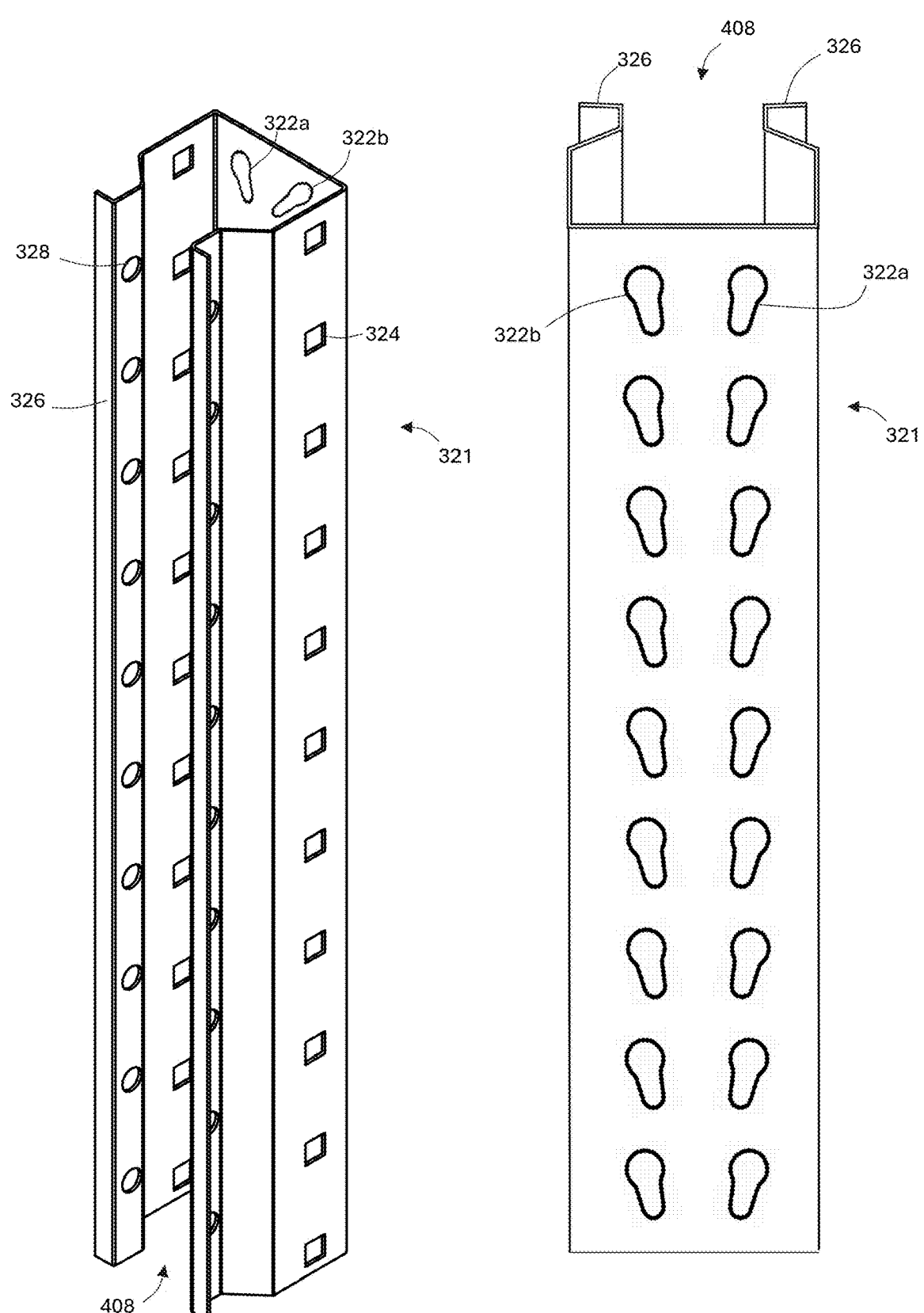
FIG. 4A is an isometric rear-quarter elevated view of the interface adapter.
FIG. 4B is a perspective front-facing view of the interface adapter.
Figure 4C:
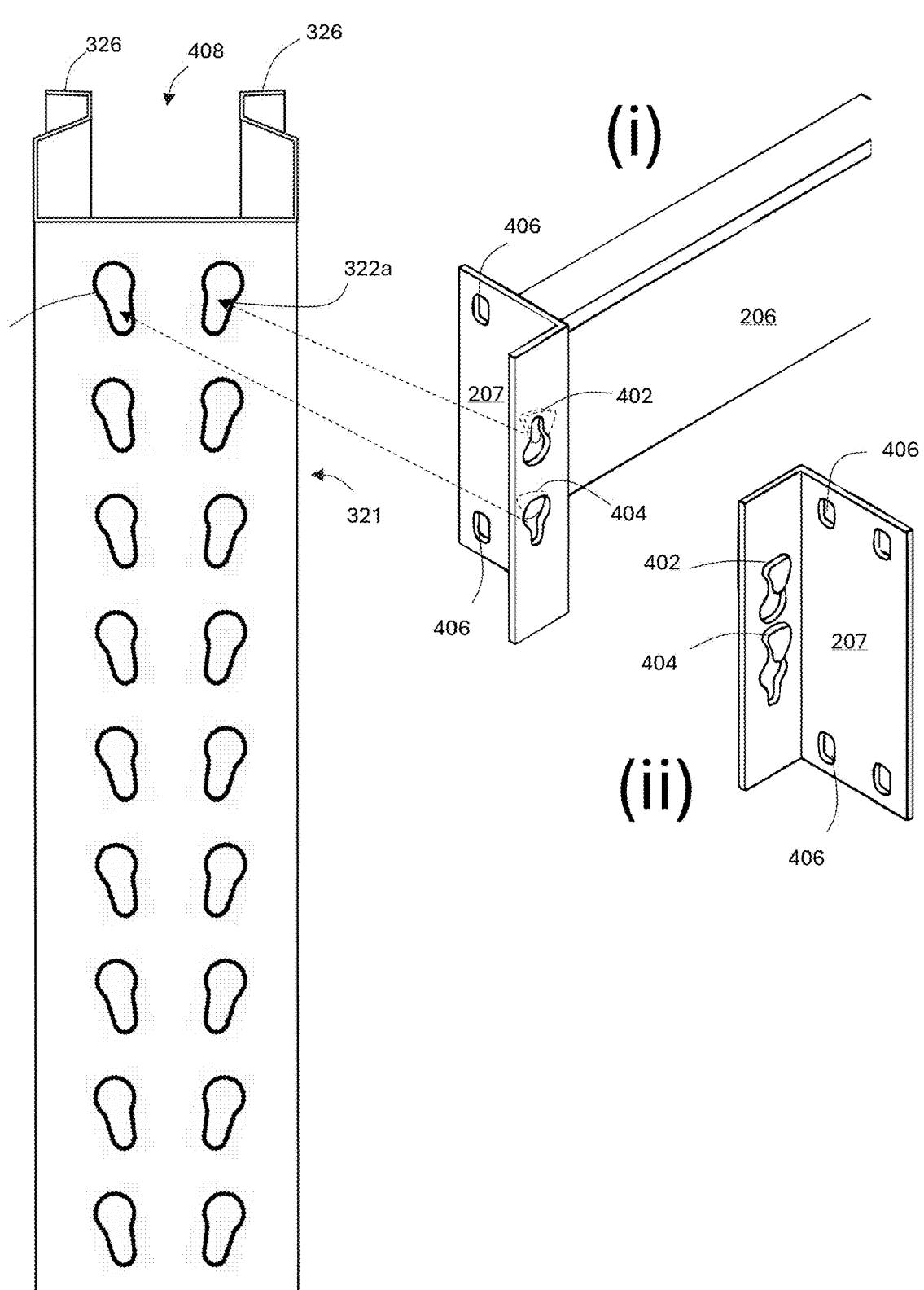
FIG. 4C is a perspective front-facing view of the interface adapter next to a front view (i) and rear view (ii) of retail shelf bracket detailing the lug and slot mating.

FIGS. 4A-4C illustrate structural details of the rack-interface adapter 321, the component that provides a replaceable low-shelf connection while cooperating mechanically with the reinforced base frame described above.

FIG. 4A is an isometric view oriented toward the rear, showing adapter 321 prior to engagement with the front adapter support post. Two mirror-image support-post flanges 326 project inward from the rear corners of the adapter and define, between them, an elongate adapter support-post receiving slot 408. Slot 408 is dimensioned to slide over the front adapter support post 323 with minimal clearance so that the adapter is guided vertically and laterally as it is slid into position. At spaced vertical intervals along the recessed rear channel, circular support-post adapter mounting apertures 328 penetrate the flange walls; these apertures register with the receiving apertures 329 in post 323 for the insertion of bolts or a through-pin, thereby securing the adapter against withdrawal or rotation.

The forward wall of adapter 321 carries two vertical columns of key-hole-shaped, front-interface shelf-receiving slots 322a (left column) and 322b (right column). The illustrated slot shape corresponds to the industry-standard "teardrop" geometry employed by many retail rack systems, enabling tool-less engagement of a shelf bracket lug that is inserted downward through the larger rounded portion and then captured beneath the narrower throat. Each lateral wall is furnished with a matching column of square side-interface shelf-receiving apertures 324 that provide an auxiliary bolting location when a positive uplift restraint or lateral shear restraint is desired.

FIG. 4B presents adapter 321 in frontal elevation. The continuous, closely-spaced array of slots 322a, 322b permits the installer to set a lower shelf at any of several discrete elevations within the floor-adjacent shelf-level zone. The upper ends of support-post flanges 326 are visible projecting rearward; when the adapter is seated, these flange tips butt against the front face of the larger main vertical tube 316, placing the adapter in compression between tube 316 and the connecting bolts inserted through apertures 328.

FIG. 4C depicts the functional relationship between adapter 321 and a representative retail shelf bracket 207 carried at the end of a lower retail shelf beam 206. Brack 207 is shown in view (i) from the front and in view (ii) from the rear. In rear view (ii), bracket 207 an upper lug 402 and a lower lug 404 are viewable and arranged to engage a vertically adjacent pair of front-interface slots 322a, 322b. Upper lug 402 and lower lug 404 are shown in front view (i) as partially hatched. Once the lugs seat beneath the throats of the slots, lateral rack-engagement apertures 406 in the bracket align with corresponding side-interface apertures 324 in the adapter, permitting insertion of a bolt or locking pin to block accidental uplift or disengagement. The figure also shows, in dashed outline, that multiple brackets 207 of identical lug geometry may be mounted to the adapter at different elevations or on opposite faces, thereby accommodating a variety of shelf layouts without altering the reinforced base frame.

Taken together, FIGS. 4A-4C demonstrate that adapter 321 provides (i) a guided, quickly installed mechanical interface to the reinforced structural post via slot 408, flanges 326, and apertures 328/329; (ii) a dense vertical pattern of standardized shelf-receiving slots 322 enabling low-level shelf placement; and (iii) optional lateral anchorage through side apertures 324. Because adapter 321 carries no significant vertical load, those loads bypass it through post 323 and tube 316. It can be fabricated in a lighter gauge and treated as a sacrificial element: if deformed by forklift contact it is removed by extracting the mounting fasteners and replaced by a new adapter, or by a unit having a different slot geometry, without disturbing the anchored base frame.

FIGS. 5A-5E present successive top-down sectional views that clarify the mechanical cooperation between the rack-interface adapter 321, the front adapter support post 323, and a retail shelf bracket 207 carried at the end of a shelf beam 206.

Figure 5A:
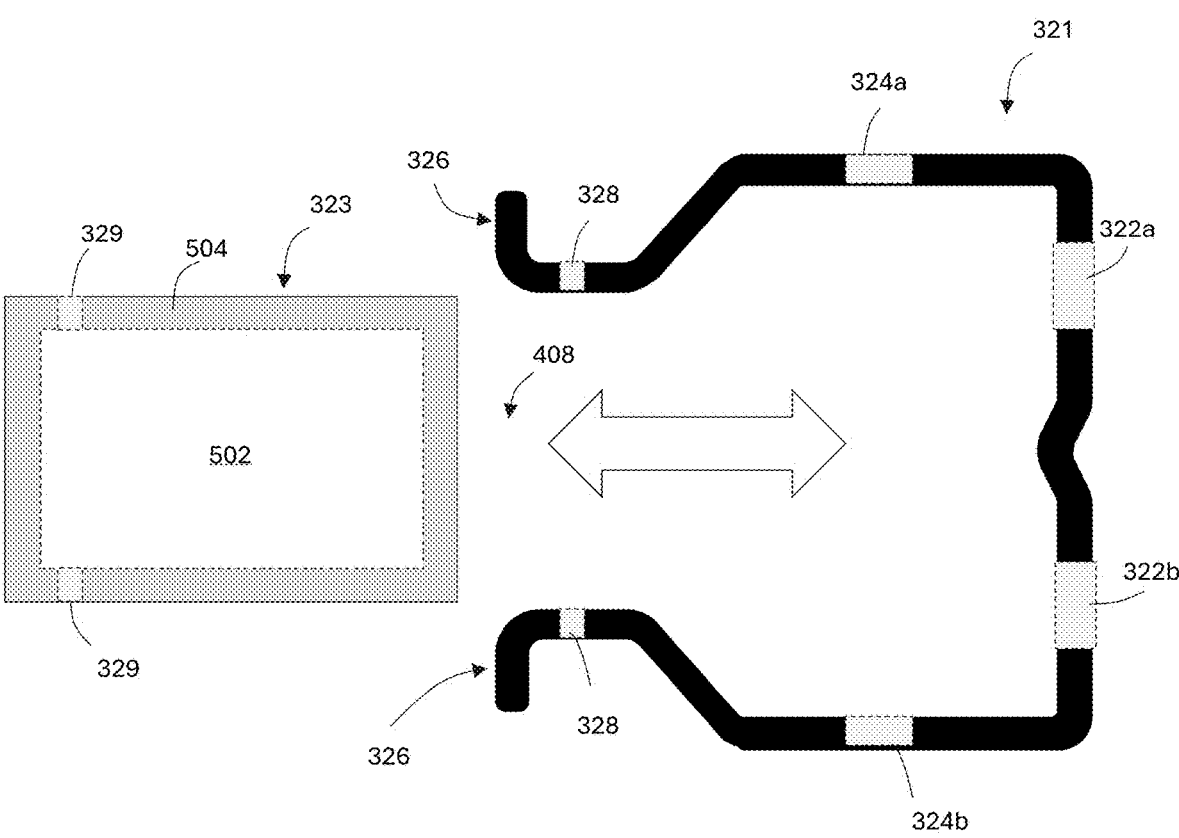
FIG. 5A is a top-down cross-sectional view of the rack interface adapter and front adapter support post oriented to receive each other via adapter support post receiving slot.

FIG. 5A shows adapter 321 in an axial position laterally separated from support post 323 and oriented for insertion along the adapter support-post receiving slot 408 (bidirectional arrow). Support post 323 is a closed rectangular tube defined by a reinforced post perimeter 504 enclosing an interstitial space 502. Opposed support-post receiving apertures 329 are formed in the lateral walls of the post. Adapter 321 is a generally channel-shaped tube whose rear wall is interrupted by slot 408 bounded by two inwardly directed support-post flanges 326. Each flange carries a support-post adapter mounting aperture 328 positioned to register with apertures 329 when the parts are fully engaged. The adapter sidewalls contain square side-interface apertures 324a, 324b, and its front wall carries dual columns of front-interface shelf-receiving slots 322a, 322b.

Figure 5B:
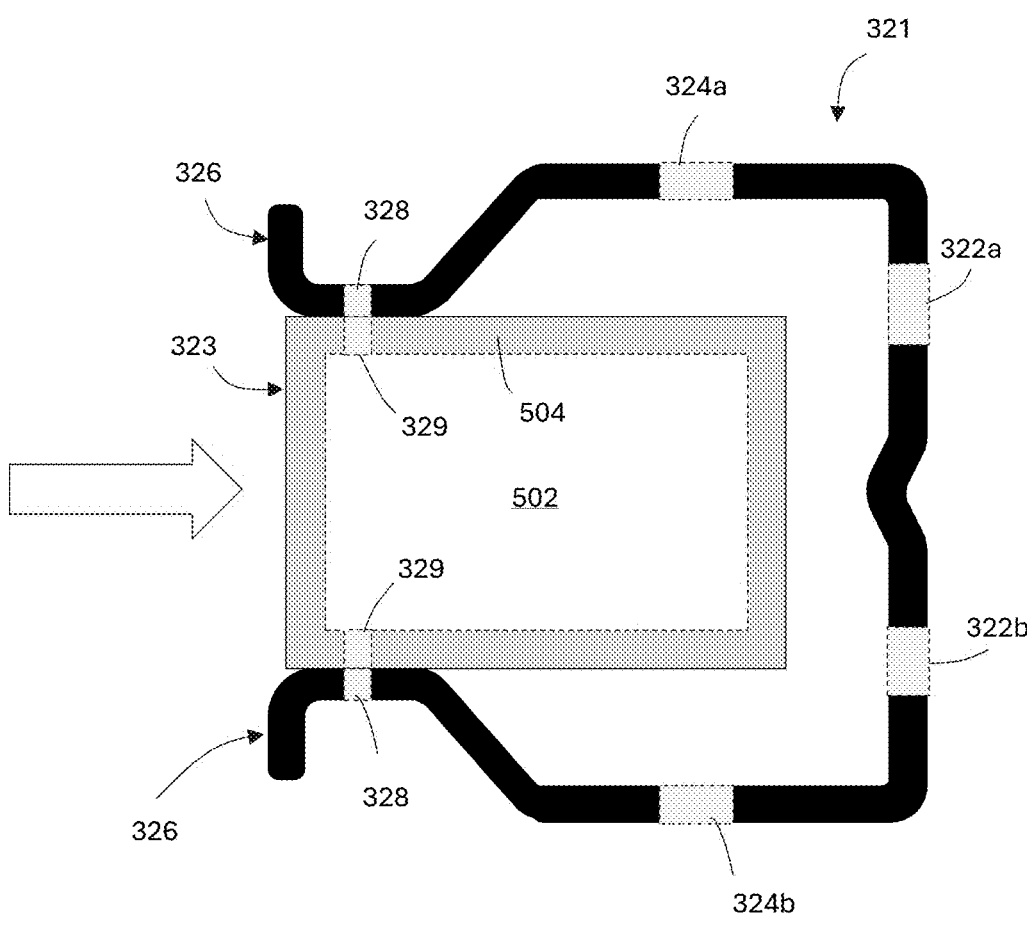
FIG. 5B is a top-down cross-sectional view of the rack interface adapter received by the front adapter support post.

In FIG. 5B the adapter has been translated laterally until post 323 is fully seated within slot 408. Flanges 326 now embrace the outer faces of post 323, and apertures 328 lie in coaxial alignment with apertures 329, ready to accept mechanical fasteners. The external faces of the adapter sit flush with, and are backed by, the larger main vertical tube 316 (out of section), converting the adapter walls into non-structural cladding while all vertical load remains in post 323.

Figure 5C:
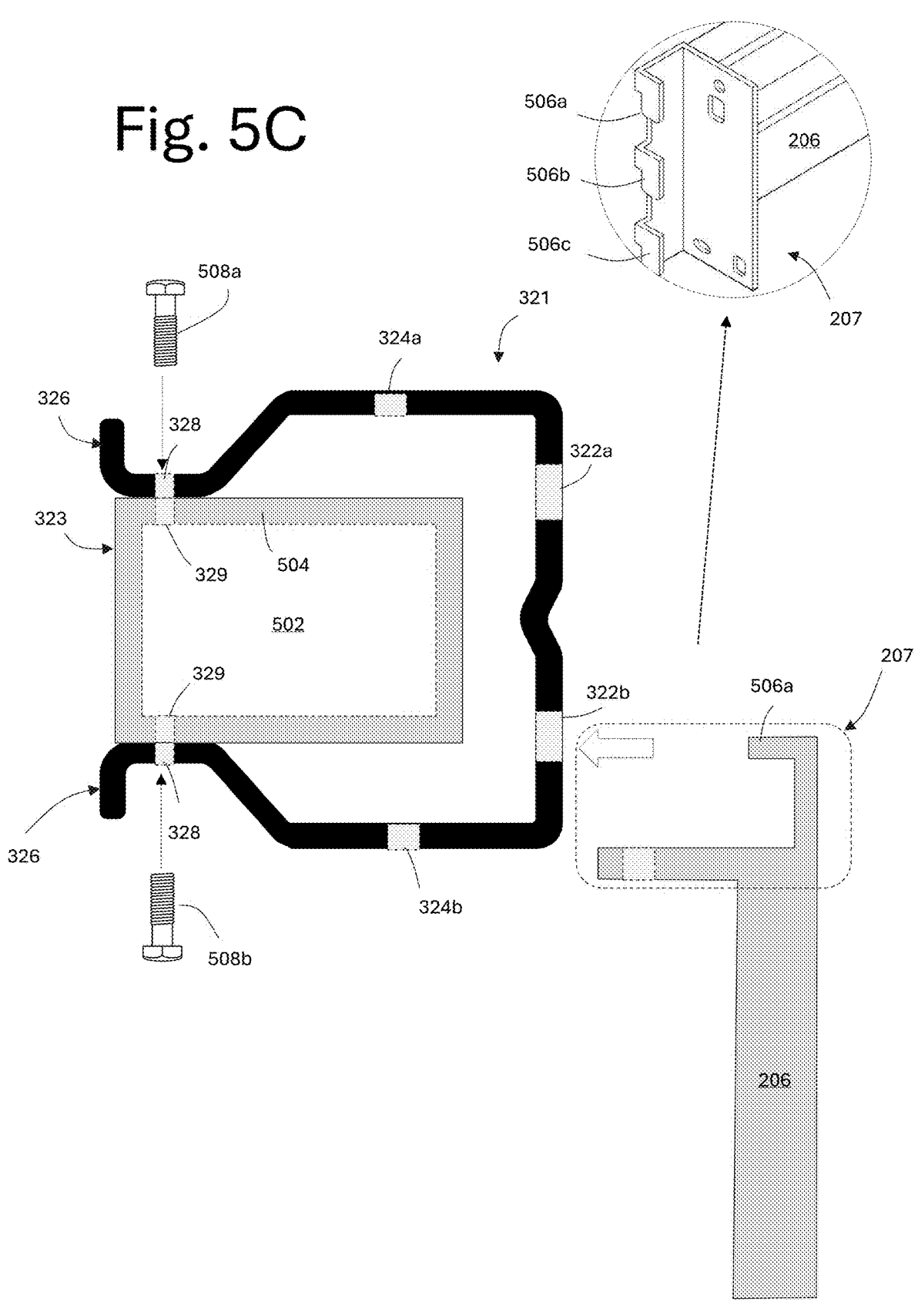
FIG. 5C is a top-down cross-sectional view of the rack interface adapter received by the front adapter support post in addition to a retail shelf bracket aligned but not yet engaging rack interface adapter along with a perspective zoomed-in detail of the a retail shelf bracket.

FIG. 5C depicts the same assembly immediately before installation of fasteners and shelf hardware. A pair of bolts 508a and 508b are depicted above and below the adapter, poised for insertion through apertures 328 and 329 to clamp the adapter to the post. At the front face, bracket 207 is illustrated in both plan and enlarged perspective. Three vertically spaced lugs, upper lug 506a, middle lug 506b, and lower lug 506c, protrude rearward from bracket 207 and are sized to enter a selected pair of shelf-receiving slots (322a or 322b) depending on whether the shelf is to the right or left of the adapter. Lateral rack-engagement apertures 406 in the bracket are positioned to overlie side-interface apertures 324 once the lugs are fully seated.

Figure 5D:
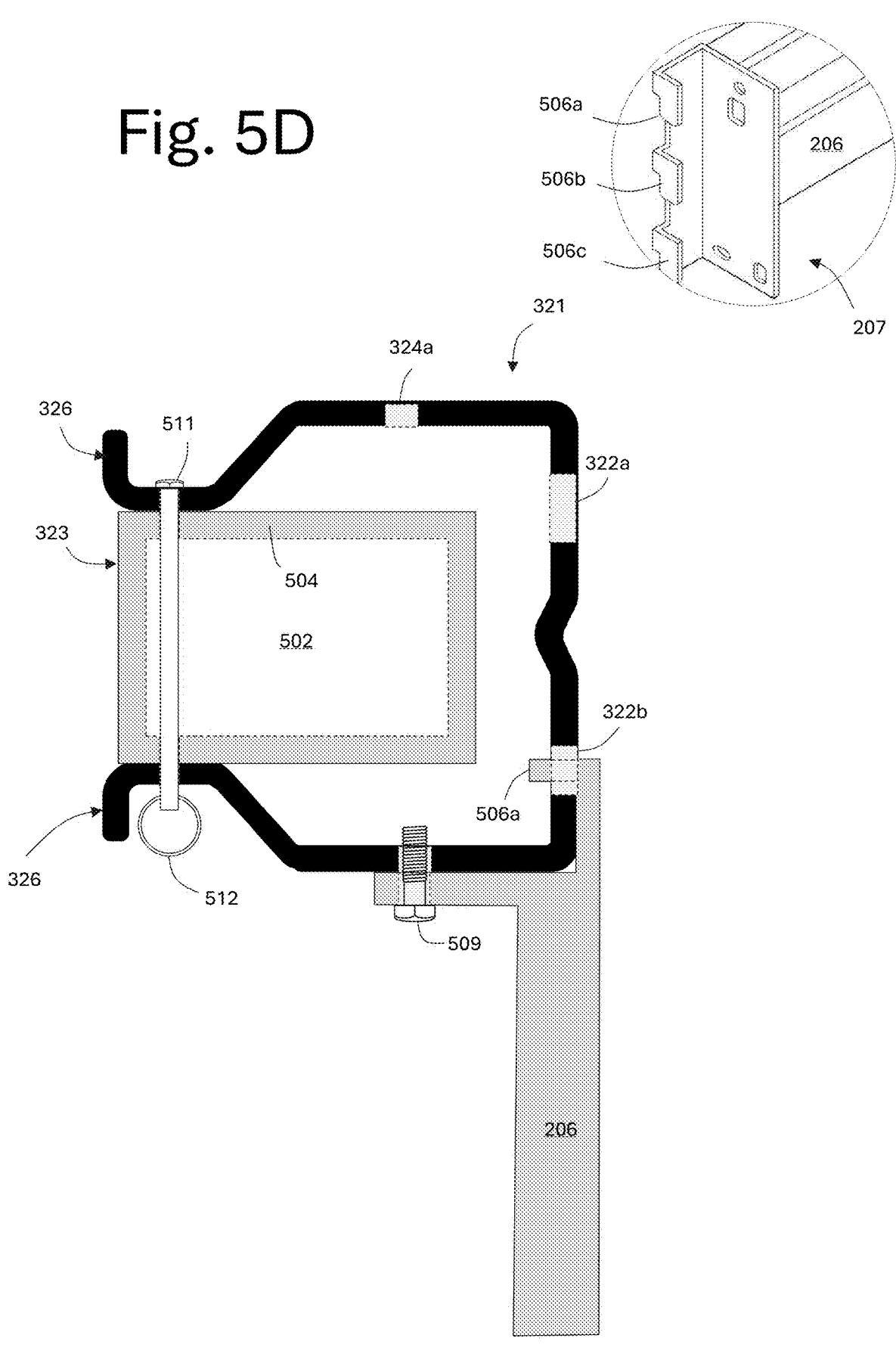
FIG. 5D is a top-down cross-sectional view of the rack interface adapter received by the front adapter support post in addition to the retail shelf bracket engaging rack interface adapter along with a perspective zoomed-in detail of the retail shelf bracket.

FIG. 5D illustrates a first fastening arrangement after completion of the joint. A single retaining thru-pin 511 extends downward through the upper set of coaxial apertures 328, 329, exiting below the post and being secured by a removable retention ring 512; this pin provides rapid installation and field replacement of the adapter. Bracket 207 has been rotated downward so that upper lug 506a is captured beneath slot 322b. A lateral rack bolt 509 is inserted through aperture 406 of the bracket and the confronting side-aperture 324b, preventing uplift or lateral shear of the bracket relative to the adapter.

Figure 5E:
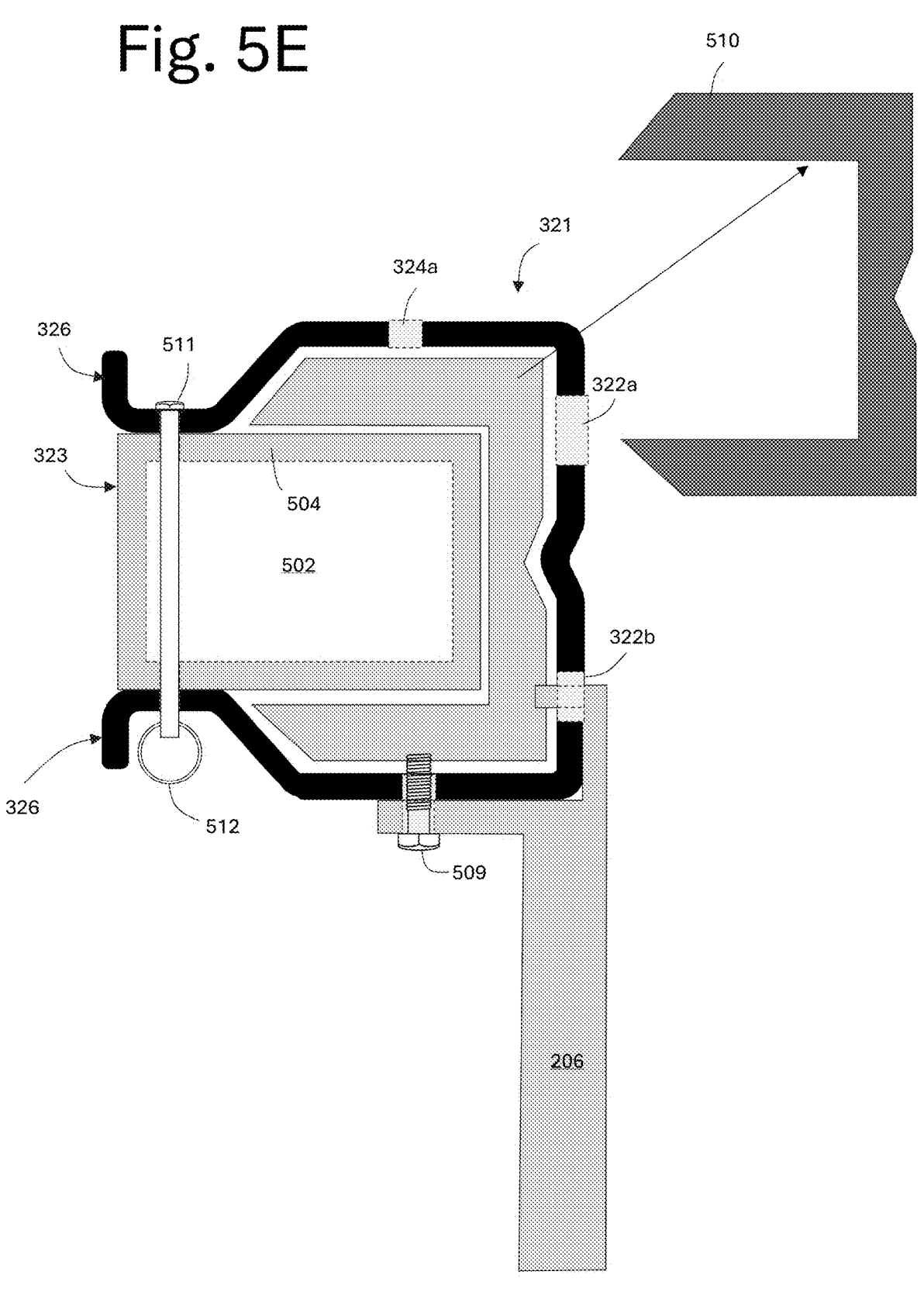
FIG. 5E is a top-down cross-sectional view of the rack interface adapter received by the front adapter support post noting the interstitial space within the cross-section of rack interface adapter.

FIG. 5E presents an alternative configuration emphasizing the sacrificial nature of the adapter. Internal dashed lines represent an interstitial clearance zone 510 within the adapter cross-section sized to accommodate the full projection depth of lugs 506 and any associated locking hardware without bearing against the structural post. The adapter walls therefore function as a thin sacrificial shell that can plastically deform around lugs or fork tines, whereas post 323 and perimeter 504 remain isolated from direct contact. Energy from an impact delivered to shelf beam 206 is transmitted first through bracket 207 into the adapter wall, then through fastener 509 and pin 511 into post 323 and ultimately into the reinforced base frame, but only after the adapter has absorbed a controlled portion of the load. When deformation exceeds an acceptable threshold, ring 512 is withdrawn, pin 511 removed, lateral bolt 509 released, and adapter 321 replaced without disturbing the anchored base or unloading the rack.

| Table of Reference Numerals | | | |
|---|---|---|---|
| Ref. No. | Description | Ref. No. | Description |
| 100 | reinforced support assembly | 310 | upper female slider |
| 102 | anchor plate | 312 | lower female slider |
| 103 | floor anchor aperture | 314 | anchor plate (assembly 300) |
| 104 | outside vertical tube | 315 | feet |
| 106 | rear backer plate | 316 | main vertical tube |
| 108 | rear cuff | 318 | front half plate |
| 110a | upper slider tube | 320 | front half cuff |
| 110b | lower slider tube | 321 | rack interface adapter |
| 112 | outside top vertical tube | 322 | front-interface shelf-receiving slot |
| 114 | upper female slider | 323 | front adapter support post |
| 115 | upper adjusting slot | 324 | side-interface shelf-receiving aperture |

-continued

Table of Reference Numerals

| Ref. No. | Description | Ref. No. | Description |
|---|---|---|---|
| 116 | lower female slider | 326 | support-post flange |
| 117 | lower adjusting slot | 328 | support-post adapter mounting aperture |
| 118 | main vertical tube | 329a | upper support-post adapter receiving aperture |
| 119a-b | upper telescoping adjusting bolts | 329b | middle support-post adapter receiving aperture |
| 120 | front cuff | 329c | lower support-post adapter receiving aperture |
| 121a-b | lower telescoping adjusting bolts | 402 | upper lug |
| 122 | front half plate | 404 | lower lug |
| 123a-b | front vertical-support retaining bolts | 406 | lateral rack-engagement aperture |
| 124a-b | rear vertical-support retaining bolts | 408 | adapter support-post receiving slot |
| 201 | floor surface | 502 | interstitial space inside front adapter support post |
| 202 | vertical post | 504 | reinforced post perimeter |
| 204 | floor-adjacent shelf-level zone | 506a | upper retail-bracket lug |
| 206 | lower retail shelf | 506b | middle retail-bracket lug |
| 207 | retail shelf bracket | 506c | lower retail-bracket lug |
| 208 | retail shelf adapter for reinforced support assembly | 508a | right lateral side-interface support bolt |
| 300 | retail rack support assembly | 508b | left lateral side-interface support bolt |
| 302 | rear vertical-post backer plate | 509 | lateral rack bolt |
| 304 | rear vertical-support cuff | 510 | interstitial space within rack interface adapter |
| 306a | upper slider tube | 511 | retaining thru-pin |
| 306b | lower slider tube | 512 | retention ring |

Glossary of Claim Terms

Adapter post means the vertically oriented, tubular member that is fixed in spaced, forward relation to the pallet-rack upright's main tube and provides the detachable docking surface for a rack-interface adapter. Machined or punched in opposed side walls of the adapter post are multiple receiving apertures positioned at predetermined, equal vertical intervals; those holes admit bolts, pins, or other removable fasteners that clamp the adapter to the post. Because the adapter post is welded or otherwise rigidly secured to the lower reinforcement frame, it transfers every vertical, horizontal, and torsional force delivered through an engaged shelf beam directly into the underlying base frame without relying on the more fragile sheet-metal wall of the replaceable adapter. The post's outside dimensions are deliberately chosen so that a counterpart adapter sleeve can telescope over it with minimal radial play, allowing the installer to slide the adapter off and on without dismantling the structural reinforcement. In service, the adapter post therefore serves two distinct functions: first, it completes the structural load path between the retail rack beam and the fortified upright, and second, it acts as an interchangeable platform that lets a technician swap different adapter geometries, such as teardrop, keystone, or slotted styles, so the repaired rack column can accept whatever beam profile a particular store layout demands, all while leaving the heavy reinforcement untouched.

Base frame means the welded lower-upright sub-assembly that is permanently anchored to the facility floor and constitutes the primary load path for both vertical pallet weight and horizontal forklift impact. It includes, at minimum, a vertically oriented main tube of heavy-gauge steel and at least one horizontally oriented brace fixed to that tube. Fabrication thickness is no less than about one-eighth inch throughout, giving the frame sufficient section modulus to function as a built-in post protector. Once installed, the base frame becomes an integral part of the rack column: axial forces from superposed rack levels descend through the existing upright into the main tube, while torsional and out-of-plane loads disperse into the brace and any optional telescoping links that tie to the rear upright. Because every replaceable part in the invention mounts to, or bears against, the base frame, all subsequent load transfers, whether from pallet weight, shelf uplift, or collision, ultimately terminate in this rigid structure, allowing sacrificial components to be swapped without disturbing floor anchors or rack continuity.

Brace (horizontal brace) means a structural member that projects from the main tube toward a rear rack column to re-establish bay depth and triangulate impact loads. Each brace is fabricated from steel stock no thinner than one-eighth inch and is welded or otherwise rigidly fixed to the main tube. In the exemplary embodiment two braces are provided, an upper brace and a lower brace, each sliding telescopically within a sleeve welded to the forward base frame and lockable by bolts passing through elongate adjustment slots. This telescoping feature allows the installer to fine-tune the brace length so the rear end clamps or bolts to the undisturbed rear upright, thereby creating a strong moment connection that closes the load loop from aisle-side impacts. When two braces are used, they form a planar truss that resists torsion and preserves column spacing; when a single brace is sufficient, it at least blocks racking or side-sway in the floor-adjacent zone. Optional braces may be omitted where the rack's original diagonal bracing remains intact.

Front adapter support post means a tubular steel column that stands forward of, parallel to, and rigidly fastened to the main tube, serving as the mounting spindle for the rack-interface adapter. This post carries at least two, and preferably three, through-apertures on opposed sidewalls, spaced vertically to accept fastening hardware at discrete elevations. Because the post is a structural element of the base frame, its wall thickness remains at or near the one-eighth-inch minimum, allowing it to accept direct pallet load transfer from any adapter clamped around it. During installation the post is cut to a height that places the uppermost receiving aperture below the lowest pallet-beam elevation, ensuring the adapter can always be secured by at least two fasteners even when shelf positions change.

Impact force means any sudden horizontal or oblique load applied to the front face of a pallet-rack column, typically generated when a forklift mast, pallet corner, or warehouse cart accidentally contacts the upright during loading or retrieval operations. Impact forces are highly dynamic, often exceeding several thousand pounds over fractions of a second, and they can introduce both bending moments and compressive stresses that exceed the elastic limits of thin-gauge roll-formed steel commonly used in standard uprights. The invention anticipates such events by specifying reinforcement members of no less than one-eighth-inch wall thickness and by locating the main tube directly behind the rack-interface adapter so that impact energy passes through the detachable sleeve into heavy steel, rather than crushing the beam-slot material itself. Designers treating impact force as a critical design case specify continuous welds, generous corner radii, and full-pen fillet sizes around brace junctions to avoid stress risers. Field repair methodology further mitigates impact force by letting operators replace only the deformed adapter sleeve after a collision, since the sleeve is purposely thinner and therefore sacrificial, while the robust base frame remains intact to take repeated hits over the service life of the rack installation.

Interior cavity means the bounded volume inside the rack-interface adapter that is defined by its front wall and by two rearwardly projecting side flanges; the adapter post occupies a central portion of this space, leaving a clearance gap around it. The cavity extends the full height of the adapter and is dimensioned laterally (in at least the ten-millimeter range) so that the protruding lugs of a shelf beam can slide completely through the front wall's engagement slots without fouling the steel surface of the adapter post. By ensuring that the lug clears the post, the cavity preserves the beam's designed seating depth and prevents false engagement conditions that could cause the beam to dislodge under load. The cavity additionally houses captive nuts or tubular spacers that align with the post's receiving apertures, enabling installers to insert through-bolts from either lateral side without needing external wrenches inside the confined rack aisle. During an impact event, the surrounding side flanges transfer compressive loads from the beam's end connector into the stout main tube, bypassing the relatively light sleeve walls. Thus, the interior cavity is simultaneously a functional clearance pocket for lug travel and a structural shell that routes forces along a controlled, predictable path.

Keyhole slot means a specific shelf-engagement aperture geometry formed in the front wall of the rack-interface adapter, characterized by a circular upper portion that merges into a narrower, vertically aligned stem. This configuration is designed to mate with lugs formed on common retail rack beams. During installation a beam lug is inserted horizontally through the enlarged round portion, after which the beam is lowered so the lug shanks travel down the stem and seat on the lower land of the slot, thereby creating an interference that resists vertical uplift. The keyhole slot's profile must balance two competing requirements: it must be wide enough to admit the lug's head without binding, yet tight enough to limit excessive beam play once seated. In the present adapter, the slot is laser-cut or punched to precise tolerances, heat-treated or coated to resist abrasion from repeated lug cycles, and repeated in a vertical array at standardized two-inch centers so warehouse staff can reconfigure beam heights quickly. Although keyhole slots are well known, their integration into a detachable sleeve that can itself be replaced without disturbing the structural reinforcement is a novel feature that differentiates the present apparatus from prior repair collars.

Lug means the outwardly projecting, generally cylindrical or rectangular boss provided on the end connector of a pallet-rack beam, intended to engage a corresponding slot in the rack upright or, in this invention, in the rack-interface adapter. Each lug carries vertical shear from the loaded beam into the column and must seat fully against a supporting land to develop its rated capacity. Lugs are typically forged or stamped from heavy-gage steel and may include a tapered leading surface that facilitates insertion into a keyhole or rectangular slot. In the disclosed system, lug geometry governs several adapter design parameters: the diameter of the keyhole's round portion, the width of its stem, and the minimum lateral clearance of the interior cavity all exceed the lug's maximum envelope to avoid binding. When impact occurs, the lug presses against the reinforced side flanges, which in turn press against the main tube, ensuring that lug-imposed stresses bypass the sleeve wall. Because lugs are removable, the rack-interface adapter must be precisely aligned both vertically and laterally; otherwise, lug engagement could be shallow, posing a safety hazard. Therefore, manufacturing fixtures for the sleeve control slot spacing to ±0.3 mm and slot-to-base reference distances to ensure interchangeability with standard beam hardware.

Main tube means the vertically oriented, heavy-wall column that forms the aisle-facing load path of the base frame. It is welded to the floor anchor or footplate and to each horizontal brace, providing a continuous structural spine from floor to splice cuff. The tube's cross-sectional area, larger than that of a standard roll-formed rack upright, is selected to absorb frontal impacts without buckling; typical dimensions are 100 mm×100 mm with a 6 mm wall. All pallet loads delivered through the rack-interface adapter ultimately bear on the main tube, which then conveys those loads to the floor anchors and rear bracing.

Rack-interface adapter means a detachable sleeve-like component that slides over the front adapter support post to furnish shelf-engagement geometry compatible with retail rack beams. Its front wall carries a vertical series of slots into which shelf-bracket lugs are inserted; its side flanges contain fastener openings that align with apertures in the post; and its rearward surfaces abut the main tube, converting pallet weight and impact force into compressive bearing against the reinforced base. Wall thickness may be less than half that of the main tube to encourage sacrificial deformation. Because the adapter is removably fastened by bolts or a single through-pin it can be replaced in minutes, allowing rapid recovery from collision damage or fast re-slotting when a store converts to a different beam standard.

Receiving aperture means a circular or oval through-hole formed in the lateral wall of the front adapter support post at a height that corresponds with a mating mounting aperture in the rack-interface adapter flange. At least two such apertures are provided so that fastening hardware captures the adapter at spaced elevations, eliminating the possibility of rotation about the post axis. The apertures may be reinforced by internal sleeves or weld rings to resist ovalization under shear from bolt preload or impact.

Removable mechanical fastener means any hardware element used to secure the rack-interface adapter to the front adapter support post while permitting tool-based removal in the field. Preferred fasteners include opposed grade-5 bolts that extend laterally through aligned flange and post apertures and thread into captive nuts located within the adapter cavity. Alternative fasteners may be shear-designed bolts or a single vertical through-pin retained by a spring clip or split ring. Fastener material strength is selected so that, in the event of severe forklift impact, the adapter wall or fastener will yield before the structural post buckles, thereby confining repair to low-cost components.

Retail shelf-bracket lug means the protruding, typically cylindrical or rectangular tang on the end of a shelf beam bracket designed to enter and lock into a complementary slot in a rack column. In conventional "teardrop" racks, the lug is inserted through a circular entry then pushed downward to seat under a narrow throat. Within the invention, the lug passes through a front-wall shelf-engagement slot and into the interior cavity of the rack-interface adapter, remaining clear of the structural post. This arrangement allows the lug to sustain vertical shear while any uplift is resisted by secondary bolts through side apertures.

Sacrificial component means a structural element intentionally engineered with lower impact resistance than the surrounding reinforced frame so that it deforms or shears first, absorbing collision energy and sparing critical load-bearing members. The rack-interface adapter exemplifies this concept: its reduced wall thickness relative to the main tube encourages controlled yielding under fork-truck strikes. Once deformed beyond service tolerance, the adapter is unfastened and replaced without unloading the rack or removing floor anchors, restoring function economically and quickly.

Shelf-engagement slot means a vertically oriented opening in the front wall of the rack-interface adapter shaped to accept and lock a shelf-bracket lug. The slot's geometry (circular entry tapering to a narrower stem in the preferred teardrop pattern) allows tool-less insertion and automatic capture of the lug under gravity. Multiple slots arranged in two columns enable shelves to be mounted on either side of the adapter at selectable heights within the floor-adjacent zone.

Side flange means one of the two rearwardly directed plates integral to the rack-interface adapter that flank the front adapter support post. Each flange bears against the main tube when the adapter is seated and contains at least one fastener opening aligned with a receiving aperture in the post. The flange thus functions simultaneously as a load-transfer surface, an alignment guide, and a fastening lug. Optional stop lips or bosses on the flange contact the main tube to establish precise fore-aft positioning and to distribute vertical load.

Teardrop geometry means an industry-standard key-hole configuration employed in many North-American pallet-rack systems, characterized by a circular upper entry portion merging into a narrower, vertically aligned throat. When a beam lug is inserted through the circular opening and dropped into the throat, upward disengagement is impeded unless the beam is lifted and pulled outward. The invention duplicates this, and other geometries, in its shelf-engagement slots so that conventional retail shelf beams can be mounted at floor level without modification.

Telescoping brace means an elongate member comprising a male slider tube received within a female sleeve welded to the base frame. During installation the brace is extended rearward until it contacts or clamps to the rack's rear upright, after which bolts through elongate adjustment slots lock length and orientation. Providing both upper and lower telescoping braces establishes a rigid assembly that resists torsional twisting of the reinforced base and preserves the original bay depth.

Through-pin means a single, elongated fastener that extends vertically through aligned apertures in the rack-interface adapter and the front adapter support post. The pin is retained at its lower end by a removable retention ring or cotter, allowing tool-less extraction. Using a through-pin accelerates replacement of a damaged adapter: the ring is pulled, the pin lifted free, and the adapter slid off the post; a new adapter is then positioned and secured by reinserting the same pin. The pin may be machined to shear at a calibrated load so that excessive impact releases the adapter before the structural frame is compromised.

Tubular member means any hollow, closed-section steel component, circular, square, or rectangular, employed in the apparatus to maximize strength-to-weight ratio and to provide torsional rigidity. Both the main tube of the base frame and the adapter post qualify as tubular members; their closed geometry resists local denting from impact and provides symmetric section properties so that bending strength is equal in the aisle and load-directions. Tubular construction also simplifies alignment of bolt holes because walls are parallel, and interior cavities can house captive nuts, lubricants, or corrosion-inhibiting foam. From a fabrication standpoint, tubes allow for clean, continuous fillet welds at brace interfaces and accept standardized end caps for improved warehouse aesthetics and personnel safety. Engineers select tube wall thickness and section modulus based on expected pallet loads (which may exceed 20 kN per shelf beam pair) and dynamic forklift collision energies informed by site risk assessments. In corrosion-prone cold-storage facilities, tubes may be hot-dip galvanized or powder-coated; drainage holes are included at lower ends to discourage condensation buildup.

Upright means the vertical column, originally part of the pallet-rack frame, that supports pallet beams, loads, and horizontal bracing. In the context of repair, the term specifically refers to the lower region of that column, often damaged by lift-truck contact, which is cut away and replaced by the reinforced lower-upright frame described herein. The reinforced section must align coaxially with the remaining, undamaged upper upright to ensure continuous axial stiffness and to preserve rack geometry. Connection between the reinforcement and the residual upright may be effected via splice plates, plug welds, or clamping collars, each designed for full moment transfer so that the repaired junction does not become the new weak spot. The upright's orientation dictates aisle clearance; therefore, installers use plumb bobs or laser levels during repair to maintain verticality within warehouse tolerances, typically ±3 mm over two meters. Once the reinforcement is installed, the upright regains its original load rating, and because the adapter post is welded to the main tube, the repaired lower section can accept interchangeable rack-interface adapters without compromising structural certification.

What is claimed is:

1. An apparatus for reinforcing a lower region of a pallet-rack upright and providing a detachable shelf-mounting interface, the apparatus comprising:

a. a rigid base frame including a vertically oriented main tube and at least one horizontally oriented brace fixed to the main tube, each fabricated and dimensioned to carry the vertical loads of an overlying pallet-rack structure and to resist fork-truck impact forces;

b. a front adapter support post spaced forward of and secured to the main tube, the front adapter support post being tubular, oriented parallel to the main tube, and defining at least two vertically separated receiving apertures on laterally opposite sides; and c. a rack-interface adapter sized to telescope over the front adapter support post and releasably fastenable thereto, the rack-interface adapter comprising i. a front wall defining a vertical array of shelf-engagement slots configured to receive shelf-bracket lugs of a retail pallet-rack beam;

ii. a pair of rearwardly directed side flanges that flank the front adapter support post and converge against a forward face of the main tube so that pallet and impact loads passed through an engaged retail pallet-rack beam are transferred into the main tube;

iii. fastening openings positioned in the side flanges to align with the receiving apertures of the front adapter support post, the rack-interface adapter being secured by removable mechanical fasteners extending through the aligned openings and apertures; and iv. an interior cavity bounded by the front wall and the side flanges that provides interstitial clearance for the shelf-bracket lugs when inserted through the shelf-engagement slots;

d. whereby the rack-interface adapter can be detached from the front adapter support post for replacement or for substitution with a rack-interface adapter having a different shelf-engagement slot geometry without removing or rebuilding the base frame, while vertical pallet loads borne by a shelf beam engaged with the shelf-engagement slots are transmitted through the rack-interface adapter into the front adapter support post, through the main tube, and into the base frame.

2. The apparatus of claim 1, wherein the removable mechanical fasteners comprise opposed bolts extending laterally through the rack-interface adapter and the front adapter support post and engaging captive nuts positioned within the interior cavity of the rack-interface adapter.

3. The apparatus of claim 1, wherein the shelf-engagement slots are shaped as keyhole openings having a circular upper portion and a narrower lower stem to accept lugs of a teardrop-type shelf bracket.

4. The apparatus of claim 1, wherein the rack-interface adapter is fabricated from steel whose wall thickness is less than one-half of the wall thickness of the main tube, thereby rendering the rack-interface adapter deformable under impact relative to the base frame.

5. The apparatus of claim 1, wherein the interior cavity has a minimum lateral width of at least ten millimeters to accommodate protrusion of a shelf-bracket lug without interfering with the front adapter support post.

6. The apparatus of claim 1, wherein the front adapter support post includes three vertically spaced receiving apertures located at substantially equal intervals along the post.

\* \* \* \* \*